US012676780B2

(12) United States Patent
Zhou et al.

(10) Patent No.: US 12,676,780 B2
(45) Date of Patent: Jul. 7, 2026

(54) OFDM SIGNAL GENERATION METHOD, RELATED DEVICE, AND APPLICATION SYSTEM

(71) Applicant: HUAWEI TECHNOLOGIES CO., LTD., Shenzhen (CN)

(72) Inventors: Baojian Zhou, Shenzhen (CN); Chenchen Liu, Shenzhen (CN); Jiajin Luo, Shenzhen (CN); Xiaohui Peng, Shenzhen (CN); Xiaoyue Hou, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 280 days.

(21) Appl. No.: 18/410,379

(22) Filed: Jan. 11, 2024

(65) Prior Publication Data

US 2024/0163154 A1 May 16, 2024

Related U.S. Application Data

(63) Continuation of application No. PCT/CN2022/105140, filed on Jul. 12, 2022.

(30) Foreign Application Priority Data

Jul. 14, 2021 (CN) .......................... 202110798954.1

(51) Int. Cl.
H04L 27/26 (2006.01)
(52) U.S. Cl.
CPC .... H04L 27/2646 (2013.01); H04L 27/26025 (2021.01)

(58) Field of Classification Search
None
See application file for complete search history.

(56) References Cited

U.S. PATENT DOCUMENTS

| | | | | |
|---|---|---|---|---|
| 2004/0240379 | A1* | 12/2004 | Tsuie | H04L 27/2647 |
| | | | | 370/210 |
| 2009/0051581 | A1* | 2/2009 | Hatono | G01S 7/285 |
| | | | | 342/134 |

(Continued)

FOREIGN PATENT DOCUMENTS

| | | |
|---|---|---|
| WO | 2016190806 A1 | 12/2016 |

OTHER PUBLICATIONS

3GPP TR 38.901 V14.3.0, "3rd Generation Partnership Project; Technical Specification Group Radio Access Network; Study on channel model for frequencies from 0.5 to 100 GHZ (Release 14)," Dec. 2017, 91 pages.

(Continued)

*Primary Examiner* — Scott M Sciacca

(74) *Attorney, Agent, or Firm* — Fish & Richardson P.C.

(57) ABSTRACT

Embodiments of the present invention disclose Orthogonal Frequency Division Multiplexing (OFDM) signal generation methods, related devices, and related application systems. An example method may include: obtaining parameter information of an OFDM signal; determining N first subcarriers and P second subcarriers from M subcarriers based on a preset parameter D; separately allocating signal power to the N first subcarriers and the P second subcarriers in two phases, to determine waveforms of the two phases, that is, a first waveform and a second waveform; and generating an OFDM signal including waveform symbols of the two phases.

20 Claims, 12 Drawing Sheets

(56) References Cited

U.S. PATENT DOCUMENTS

2015/0373649 A1* 12/2015 Tabet ...................... H04L 5/006
                                                                 370/329
2017/0163456 A1* 6/2017 Chen .................... H04L 5/0037
2024/0223427 A1* 7/2024 Xin ................... H04L 27/26025

OTHER PUBLICATIONS

Ma et al., "Joint Radar-Communications Strategies for Autonomous Vehicles," CoRR, Submitted on May 28, 2020, arXiv: 1909. 01729v2, 21 pages.
Office Action in Indian Appln. No. 202417003948, mailed on Apr. 21, 2026, 7 pages (with English translation).

* cited by examiner

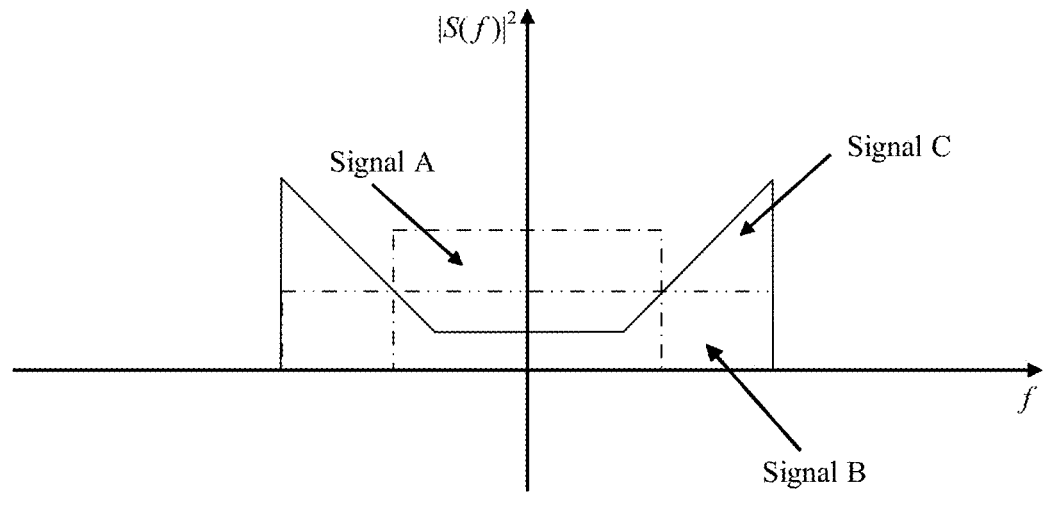
FIG. 1c
Active scenario
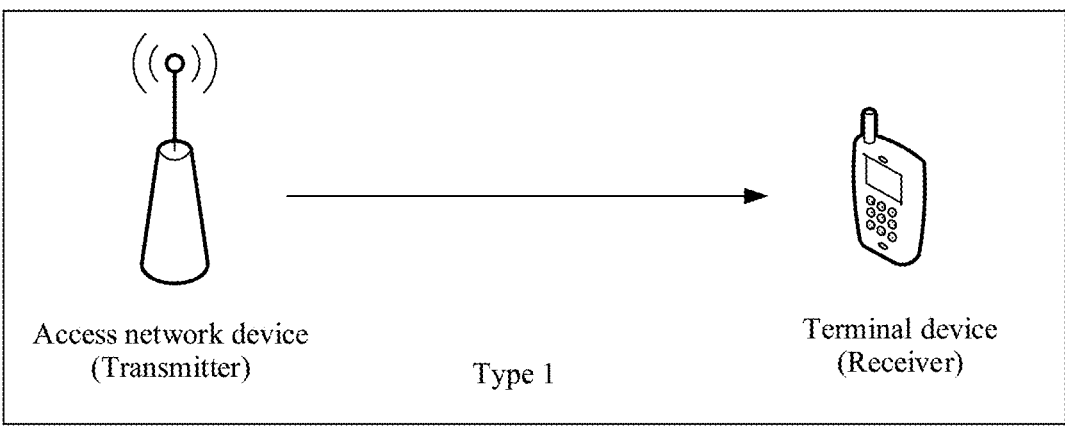
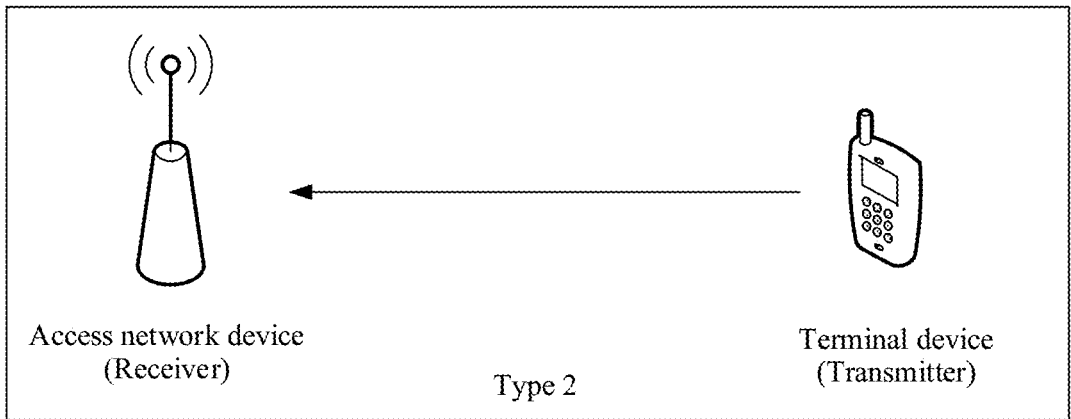
FIG. 2a

Passive scenario
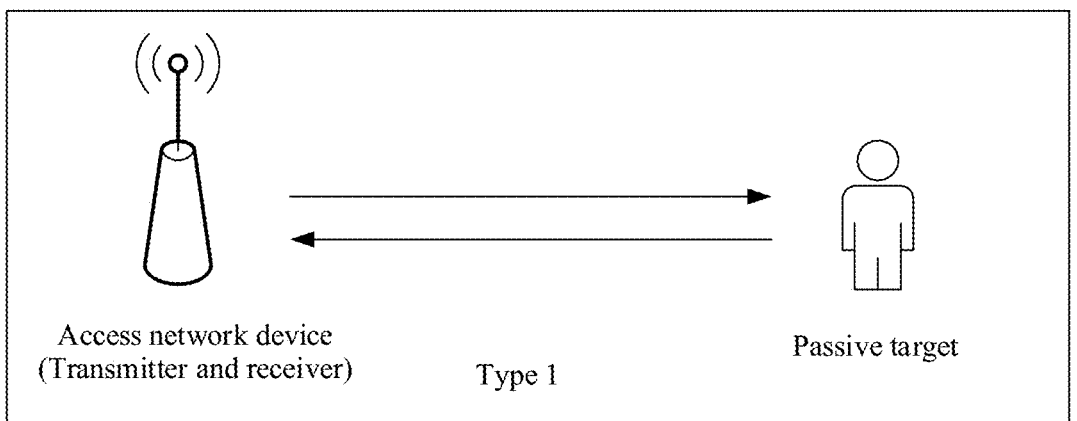
Access network device
(Transmitter and receiver)          Type 1          Passive target
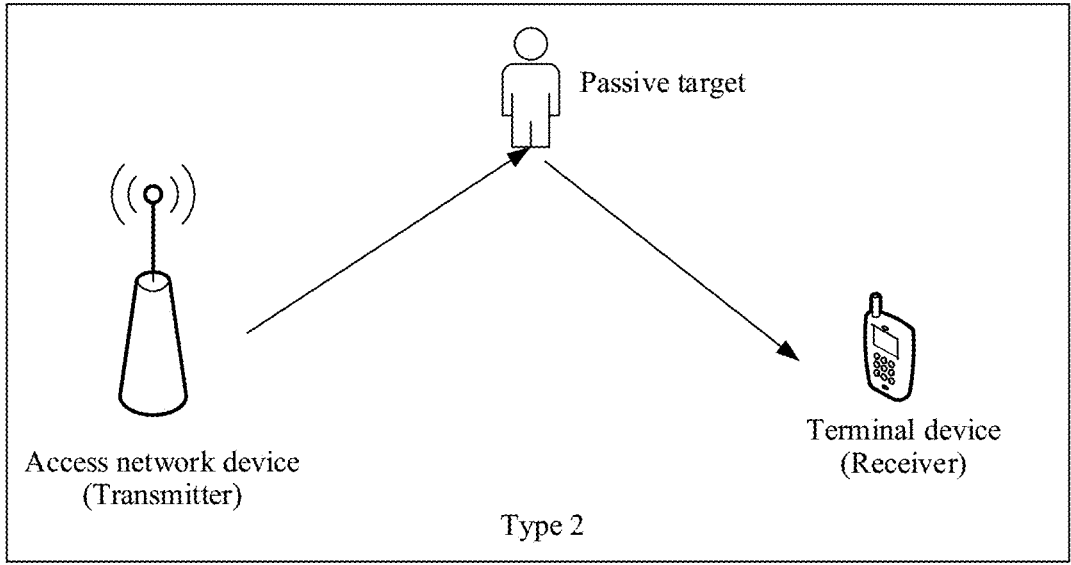
Passive target
Access network device
(Transmitter)          Type 2          Terminal device
(Receiver)
FIG. 2b

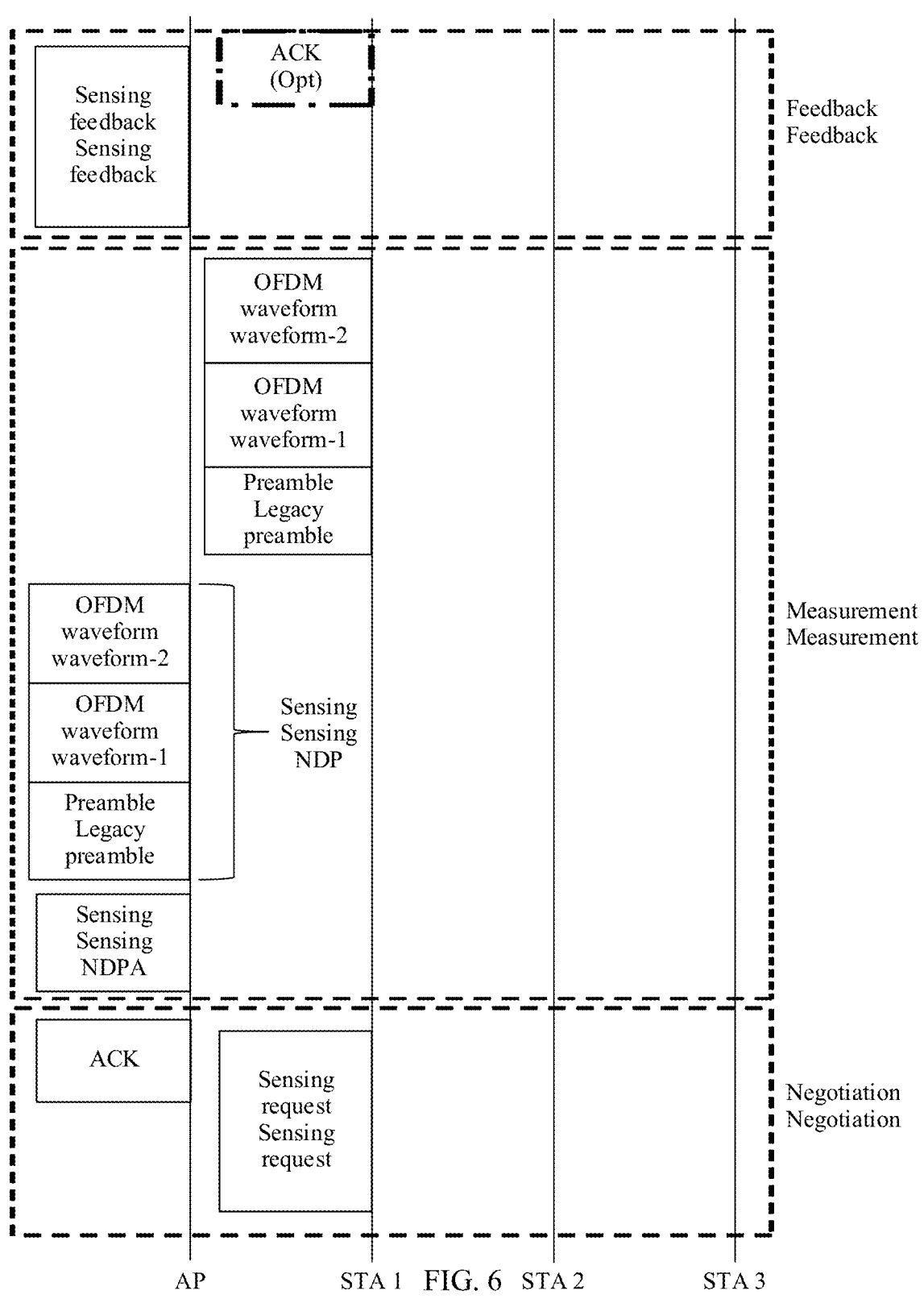
AP STA 1 FIG. 6 STA 2 STA 3

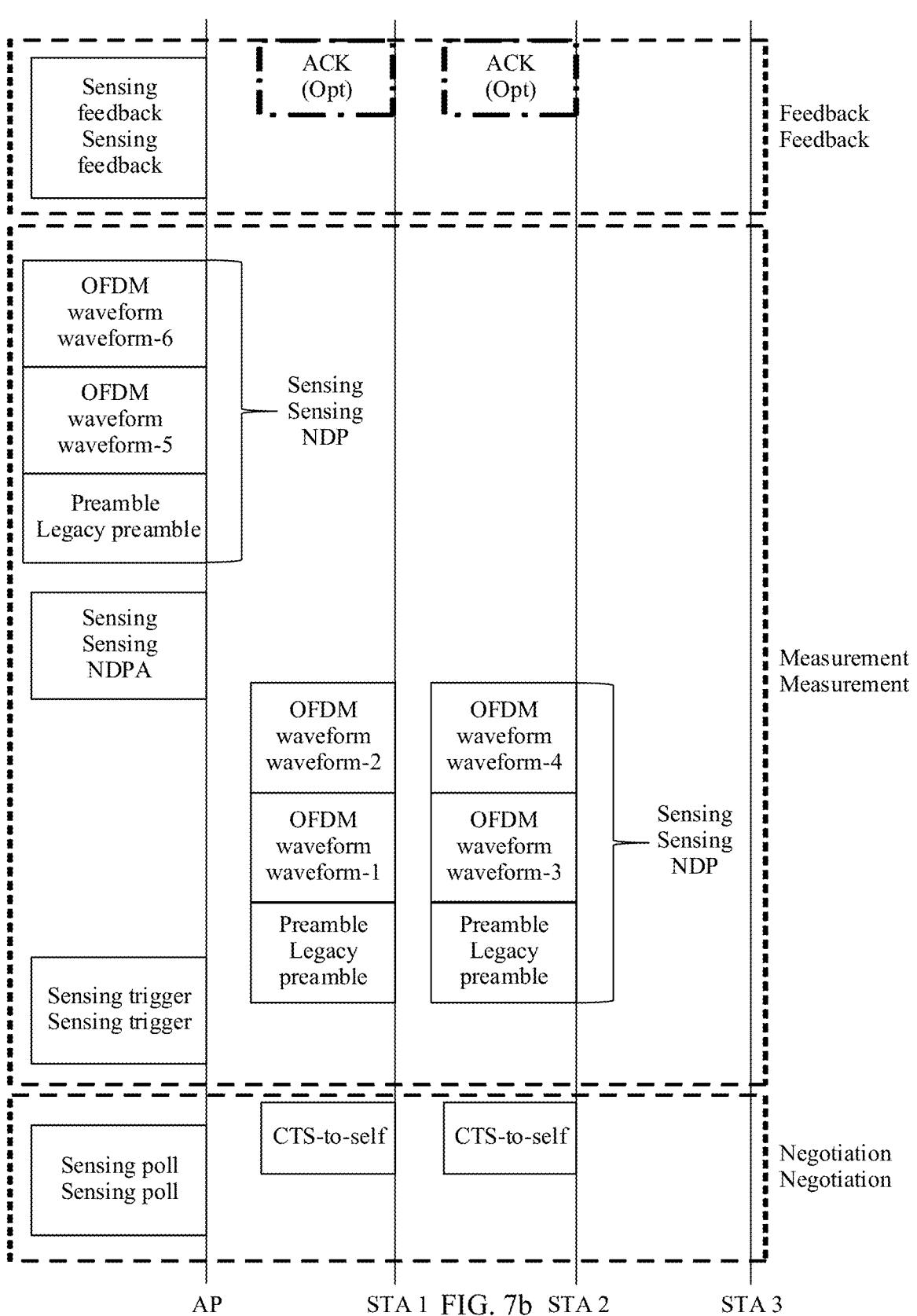
AP STA 1 FIG. 7b STA 2 STA 3

OFDM SIGNAL GENERATION METHOD, RELATED DEVICE, AND APPLICATION SYSTEM

CROSS-REFERENCE TO RELATED APPLICATIONS

This application is a continuation of International Application No. PCT/CN2022/105140, filed on Jul. 12, 2022, which claims priority to Chinese Patent Application No. 202110798954.1, filed on Jul. 14, 2021. The disclosures of the aforementioned applications are hereby incorporated by reference in their entireties.

TECHNICAL FIELD

The present invention relates to the field of communication technologies, and in particular, to an OFDM signal generation method, a related device, and an application system.

BACKGROUND

With the rapid development of the internet of science and technology, a location-based ranging measurement and positioning service gradually penetrates into work and life of the public, and gradually becomes an indispensable service in a public service field. The location-based ranging measurement and positioning service has become a technical foundation for many services such as traffic guidance, location query, position query, vehicle tracking, business network point query, child care, and emergency call, and can effectively affect all aspects of the work and life of the public and the public service field.

Currently, almost all technologies for ranging measurement and positioning by using radio are derived and developed from radar technologies. A basic principle of the ranging measurement and positioning technology is to determine a distance and a location of a measured object based on a propagation speed of the radio and propagation time of the radio. However, a conventional ranging measurement and positioning technology still has many disadvantages. For example, a ranging measurement and positioning method based on an orthogonal frequency division multiplexing (Orthogonal Frequency Division Multiplexing, OFDM) signal communication system has problems of low ranging measurement and positioning precision and a poor range ambiguity resistance capability, and cannot meet a higher requirement of the public for a ranging measurement and positioning service. Therefore, how to provide a ranging measurement and positioning solution with higher precision and a stronger range ambiguity resistance capability is an urgent problem to be resolved.

SUMMARY

Embodiments of the present invention provide an OFDM signal generation method, a related device, and an application system. When a generated OFDM signal is used in a ranging measurement and positioning scenario, ranging measurement and positioning precision and a range ambiguity resistance capability can be improved.

According to a first aspect, an embodiment of the present invention provides an OFDM signal generation method. The method may include:

obtaining parameter information of a to-be-generated OFDM signal, where the parameter information includes total power W of the to-be-generated OFDM signal and frequencies respectively corresponding to M subcarriers included in the to-be-generated OFDM signal; determining N first subcarriers and P second subcarriers from the M subcarriers based on a preset parameter D, where both N and P are positive integers less than M; allocating W1 in the total power W to frequencies respectively corresponding to the N first subcarriers, and determining a first waveform; allocating W2 in the total power W to frequencies respectively corresponding to the P second subcarriers, and determining a second waveform, where W=W1+W2; and generating, based on the first waveform and the second waveform, the to-be-generated OFDM signal corresponding to the parameter information, where the to-be-generated OFDM signal includes a signal corresponding to the first waveform and a signal corresponding to the second waveform.

In this embodiment of the present invention, before the OFDM signal is generated, the parameter information of the OFDM signal is first obtained, and then the N first subcarriers and the P second subcarriers are determined from the M subcarriers of the OFDM signal based on the parameter information and a preset parameter. In one phase, only a part of power is allocated to the N first subcarriers, and other (M-N) subcarriers temporarily do not carry the power, to form the first waveform. However, in another phase, only the other part of the power is allocated to the P second subcarriers, and other (M-P) subcarriers temporarily do not carry the power, to form the second waveform. In this case, features of waveforms (that is, the first waveform and the second waveform) of the two phases of the OFDM signal are determined, and the OFDM signal including a symbol corresponding to the first waveform and a symbol corresponding to the second waveform is generated. In the foregoing process of generating the OFDM signal, allocation of signal power is divided into two different phases. In one phase, signal power is allocated only to a subcarrier (that is, the N first subcarriers) in a specific bandwidth to form the first waveform. Compared with a manner in which signal power is allocated to all subcarriers (that is, the M subcarriers) in the conventional technology, a frequency spacing between any two subcarriers that carry power in the first waveform is smaller. However, in another phase, signal power is allocated only on a few subcarriers (that is, the P second subcarriers) with a lowest frequency and a highest frequency to form the second waveform. Compared with a manner in which signal power is allocated to all subcarriers (that is, the M subcarriers) in the conventional technology, a power allocation manner of the second waveform enables a root mean square bandwidth of the second waveform to be larger. In a ranging measurement and positioning scenario, a maximum unambiguous range of a pair of subcarriers with a small frequency spacing is large, and precision of a signal with a larger root mean square bandwidth is higher. Therefore, when the OFDM signal carrying the symbol corresponding to the first waveform and the symbol corresponding to the second waveform in this embodiment of the present invention is used in the ranging measurement and positioning scenario, a range ambiguity resistance capability and precision of ranging measurement and positioning can be effectively improved.

In a possible implementation, the parameter information further includes a bandwidth B of the to-be-generated OFDM signal; and the determining N first subcarriers and P second subcarriers from the M subcarriers based on a preset parameter D includes: determining a first frequency band based on the preset parameter D, where the first frequency band is a continuous frequency segment on the bandwidth B of the to-be-generated OFDM signal; determining N subcarriers in the first frequency band as the N first subcarriers; and determining the P second subcarriers based on the first frequency band and the bandwidth B of the to-be-generated OFDM signal.

In this embodiment of the present invention, in a process of determining the N first subcarriers in the first waveform, the continuous frequency segment (that is, the first frequency band) is first determined on the bandwidth B of the to-be-generated OFDM signal. The N subcarriers (the N subcarriers may be all subcarriers in the frequency band, or may be some subcarriers in the frequency band) in the continuous frequency segment are determined as the N first subcarriers. Signal power in this phase is distributed only on the N first subcarriers, and other (M-N) subcarriers temporarily do not carry power, to form the first waveform. In this way, power is allocated only on subcarriers in a specific bandwidth, and a range of any two subcarriers carrying the power is reduced from the entire bandwidth B (that is, in the conventional technology, signal power is allocated to all the M subcarriers, and an extreme value of a frequency spacing between any two subcarriers carrying power is B) to the first frequency band. Therefore, it is ensured that a frequency spacing between any two subcarriers carrying power is smaller. In the ranging measurement and positioning scenario, a maximum unambiguous range of a pair of subcarriers with a small frequency spacing is large. Therefore, when the first waveform is used in the ranging measurement and positioning scenario, a stronger range ambiguity resistance capability is provided.

In a possible implementation, the determining a first frequency band based on the preset parameter D includes:
  determining a bandwidth $\Delta F$ of the first frequency band based on a first preset condition and the preset parameter D; and
  determining, as the first frequency band, a frequency band with a frequency spacing of $\Delta F$ between a subcarrier with a highest frequency and a subcarrier with a lowest frequency in any frequency band on the bandwidth B.

In this embodiment of the present invention, in a process of determining the first frequency band, the bandwidth $\Delta F$ of the first frequency band is first calculated based on the preset parameter D, and then a continuous frequency band is determined from the entire bandwidth B of the to-be-generated OFDM signal as the first frequency band based on a requirement of the bandwidth $\Delta F$. That is, there may be a plurality of frequency bands with a bandwidth $\Delta F$ on the bandwidth B, and any one of the plurality of frequency bands may be determined as the first frequency band. Further, the N subcarriers (the N subcarriers may be all subcarriers in the frequency band, or may be some subcarriers in the frequency band) in this continuous frequency segment are determined as the N first subcarriers, and then the signal power in this phase is distributed only on the N first subcarriers, and the other (M-N) subcarriers temporarily do not carry the power, to form the first waveform. In this way, the power is allocated only on the subcarriers in the specific bandwidth $\Delta F$, and a range of any two subcarriers carrying the power is reduced from the entire bandwidth B to a small frequency segment whose bandwidth is $\Delta F$. Therefore, it is ensured that a frequency spacing between any two subcarriers carrying power is smaller (an extreme value is $\Delta F$). In the ranging measurement and positioning scenario, a maximum unambiguous range of a pair of subcarriers with a small frequency spacing is large. Therefore, when the first waveform is used in the ranging measurement and positioning scenario, a stronger range ambiguity resistance capability is provided.

In a possible implementation, the first preset condition is:

$$\Delta F \le \frac{c}{D},$$

where C is a signal propagation speed, D is the preset parameter D, and $\Delta F$ is the bandwidth of the first frequency band.

In this embodiment of the present invention, in a process of determining the first frequency band, the signal propagation speed C and the preset parameter D may be used to limit the bandwidth of the first frequency band. When this embodiment of the present invention is applied to a ranging measurement and positioning scenario, the preset parameter D may be a ranging measurement and positioning range (which may be understood as a maximum unambiguous range) that needs to be supported in a specific scenario. For example, in an active target scenario, the preset parameter D may be defined as a distance from a transmitter to a receiver, and in a passive target scenario, the preset parameter D may be defined as a sum of a distance from a transmitter to a target and a distance from the target to a receiver. When a range that is in ranging measurement and that needs to be supported is larger, the bandwidth $\Delta F$ of the first frequency band is smaller, and signal power is distributed only on the N first subcarriers in the bandwidth $\Delta F$. Therefore, a frequency spacing between any two subcarriers that carry the power is smaller (an extreme value is $\Delta F$), and a range ambiguity resistance capability is stronger in the ranging measurement and positioning scenario.

In a possible implementation, the parameter information further includes a frequency spacing $\Delta_f$ between adjacent subcarriers of the to-be-generated OFDM signal, and the method further includes:
  determining the N subcarriers in the first frequency band based on $\Delta F$ and $\Delta_f$, where $$N = \frac{\Delta F}{\Delta_f} + 1.$$

In this embodiment of the present invention, in a phase of determining the first waveform, after $\Delta F$ and the first frequency band corresponding to $\Delta F$ are determined, a quantity N of all subcarriers in the first frequency band may be determined based on the frequency spacing $\Delta_f$ between the adjacent subcarriers, and then the signal power is distributed only on the N first subcarriers, and the other (M-N) subcarriers temporarily do not carry the power, to form the first waveform. In other words, all subcarriers in the first frequency band carry the power. However, other subcarriers located beyond the first frequency band temporarily do not carry the power, so that the power is allocated only to subcarriers in a specific bandwidth $\Delta F$, and a range of any two subcarriers carrying power is reduced from the entire bandwidth B to a small frequency segment of the bandwidth F. Therefore, it is ensured that a frequency spacing between any two subcarriers carrying power is smaller (an extreme value is $\Delta F$). In the ranging measurement and positioning scenario, a maximum unambiguous range of a pair of subcarriers with a small frequency spacing is large. Therefore, when the first waveform is used in the ranging measurement and positioning scenario, a stronger range ambiguity resistance capability is provided.

In a possible implementation, the determining the P second subcarriers based on the first frequency band and the bandwidth B of the to-be-generated OFDM signal includes:

determining, based on a second preset condition and ΔF, K subcarriers with a highest frequency and K subcarriers with a lowest frequency on the bandwidth B, where K is a positive integer less than $$\frac{M}{2},$$

and M is a total quantity of subcarriers included in the to-be-generated OFDM signal; and determining, as the P second subcarriers, the K subcarriers with the highest frequency and the K subcarriers with the lowest frequency on the bandwidth B, where P=2K.

In this embodiment of the present invention, after the bandwidth ΔF of the first frequency band is determined, a phase of determining the second waveform may be entered. First, a few subcarriers with a highest frequency and a few subcarriers with a lowest frequency on the bandwidth B of the to-be-generated OFDM signal are further determined based on the bandwidth ΔF, and then the signal power is distributed only on these few subcarriers, and other subcarriers on the bandwidth B temporarily do not carry the power, to form the second waveform. In this way, the power is allocated only on a few subcarriers on two sides of the bandwidth B. Compared with a manner in which signal power is allocated on all the subcarriers (that is, the M subcarriers) in the conventional technology, a root mean square bandwidth of the second waveform is larger. In the ranging measurement and positioning scenario, a signal with a larger root mean square bandwidth has higher ranging measurement and positioning precision. Therefore, when the second waveform is used in the ranging measurement and positioning scenario, higher ranging measurement and positioning precision can be implemented.

In a possible implementation, the determining the P second subcarriers based on the first frequency band and the bandwidth B of the to-be-generated OFDM signal includes:

determining a second frequency band based on the first frequency band, where the second frequency band is one or more continuous frequency segments in the bandwidth B, and the second frequency band is a complementary set of the first frequency band for the bandwidth B;

determining, based on a second preset condition and ΔF, K subcarriers with a highest frequency and K subcarriers with a lowest frequency on the second frequency band; and determining, as the P second subcarriers, the K subcarriers with the highest frequency and the K subcarriers with the lowest frequency on the second frequency band, where P=2K.

In this embodiment of the present invention, after the first frequency band is determined, a phase of determining the second waveform may be entered. First, the second frequency band on the bandwidth B is further determined based on the first frequency band, and then a few subcarriers with a highest frequency and a few subcarriers with a lowest frequency on the second frequency band are determined. Finally, signal power is distributed only on these few subcarriers, and other subcarriers temporarily do not carry the power, to form the second waveform. In this way, the power is allocated only on a few subcarriers on two sides of the second frequency band. Compared with a manner in which signal power is allocated on all the subcarriers (that is, the M subcarriers) in the conventional technology, a root mean square bandwidth of the second waveform is larger. In the ranging measurement and positioning scenario, a signal with a larger root mean square bandwidth has higher ranging measurement and positioning precision. Therefore, when the second waveform is used in the ranging measurement and positioning scenario, higher ranging measurement and positioning precision can be implemented. In addition, because there is no intersection between the first frequency band and the second frequency band, the subcarriers (that is, the N first subcarriers) carrying the signal power in one phase (that is, the first waveform) temporarily do not carry the power in another phase (that is, the second waveform). Therefore, when power of the two phases is analyzed on an entire spectrum as a whole, a case in which power of a subcarrier (namely, a frequency) is excessively high because the subcarrier carries power in both phases does not occur. This can protect a device and meet a power limitation.

In a possible implementation, the second preset condition is:

$$1 \le K \le \left\lfloor \frac{B - \Delta F}{2 * \Delta f} \right\rfloor,$$

where B is the bandwidth of the to-be-generated OFDM signal, $\Delta_f$ is the frequency spacing between the adjacent subcarriers of the to-be-generated OFDM signal, ΔF is the bandwidth of the first frequency band, and $\lfloor \bullet \rfloor$ is a rounding-down operation.

In this embodiment of the present invention, after the bandwidth ΔF of the first frequency band is determined, specific K subcarriers with a highest frequency and K subcarriers with a lowest frequency on the bandwidth B or the second frequency band are further determined based on $\Delta_f$, and then signal power is distributed only on the 2K subcarriers, and other (M–2K) subcarriers temporarily do not carry the power, to form a second waveform. In this way, power is allocated only on a few subcarriers on two sides of the bandwidth B or the second frequency band. Compared with a manner in which signal power is allocated on all the subcarriers (that is, the M subcarriers) in the conventional technology, a root mean square bandwidth of the second waveform is larger. In the ranging measurement and positioning scenario, a signal with a larger root mean square bandwidth has higher ranging measurement and positioning precision. Therefore, when the second waveform is used in the ranging measurement and positioning scenario, higher ranging measurement and positioning precision can be implemented.

According to a second aspect, an embodiment of the present invention provides an OFDM signal generation apparatus. The apparatus may include:

an obtaining unit, configured to obtain parameter information of a to-be-generated OFDM signal, where the parameter information includes total power W of the to-be-generated OFDM signal and frequencies respectively corresponding to M subcarriers included in the to-be-generated OFDM signal;

a first determining unit, configured to determine N first subcarriers and P second subcarriers from the M subcarriers based on a preset parameter D, where both N and P are positive integers less than M;

a second determining unit, configured to: allocate W1 in the total power W to frequencies respectively corresponding to the N first subcarriers, and determine a first waveform;

a third determining unit, configured to: allocate W2 in the total power W to frequencies respectively corresponding to the P second subcarriers, and determine a second waveform, where W=W1+W2; and a generation unit, configured to generate, based on the first waveform and the second waveform, the to-be-generated OFDM signal corresponding to the parameter information, where the to-be-generated OFDM signal includes a signal corresponding to the first waveform and a signal corresponding to the second waveform.

In this embodiment of the present invention, before the OFDM signal is generated, the obtaining unit obtains the parameter information of the OFDM signal, and then the first determining unit determines the N first subcarriers and the P second subcarriers from the M subcarriers of the OFDM signal based on the parameter information and a preset parameter. In one phase, the second determining unit allocates only a part of power to the N first subcarriers, and other (M-N) subcarriers temporarily do not carry the power, to form the first waveform. However, in another phase, the third determining unit allocates only the other part of the power to the P second subcarriers, and other (M-P) subcarriers temporarily do not carry the power, to form the second waveform. In this case, the second determining unit and the third determining unit separately determine features of waveforms (that is, the first waveform and the second waveform) of the two phases of the OFDM signal, and the generation unit generates the OFDM signal including a symbol corresponding to the first waveform and a symbol corresponding to the second waveform. In the foregoing process of generating the OFDM signal, allocation of signal power is divided into two different phases. In one phase, signal power is allocated only to a subcarrier (that is, the N first subcarriers) in a specific bandwidth to form the first waveform. Compared with a manner in which signal power is allocated to all subcarriers (that is, the M subcarriers) in the conventional technology, a frequency spacing between any two subcarriers that carry power in the first waveform is smaller. However, in another phase, signal power is allocated only on a few subcarriers (that is, the P second subcarriers) with a lowest frequency and a highest frequency to form the second waveform. Compared with a manner in which signal power is allocated to all subcarriers (that is, the M subcarriers) in the conventional technology, a power allocation manner of the second waveform enables a root mean square bandwidth of the second waveform to be larger. In a ranging measurement and positioning scenario, a maximum unambiguous range of a pair of subcarriers with a small frequency spacing is large, and precision of a signal with a larger root mean square bandwidth is higher. Therefore, when the OFDM signal carrying the symbol corresponding to the first waveform and the symbol corresponding to the second waveform in this embodiment of the present invention is used in the ranging measurement and positioning scenario, a range ambiguity resistance capability and precision of ranging measurement and positioning can be effectively improved.

In a possible implementation, the parameter information further includes a bandwidth B of the to-be-generated OFDM signal; and the first determining unit is specifically configured to:

determine a first frequency band based on the preset parameter D, where the first frequency band is a continuous frequency segment on the bandwidth B of the to-be-generated OFDM signal;

determine N subcarriers in the first frequency band as the N first sub carriers; and determine the P second subcarriers based on the first frequency band and the bandwidth B of the to-be-generated OFDM signal.

In a possible implementation, the first determining unit is specifically configured to:

determine a bandwidth $\Delta F$ of the first frequency band based on a first preset condition and the preset parameter D; and determine, as the first frequency band, a frequency band with a frequency spacing of $\Delta F$ between a subcarrier with a highest frequency and a subcarrier with a lowest frequency in any frequency band on the bandwidth B.

In a possible implementation, the first preset condition is:

$$\Delta F \leq \frac{c}{D},$$

where C is a signal propagation speed, D is the preset parameter D, and $\Delta F$ is the bandwidth of the first frequency band.

In a possible implementation, the parameter information further includes a frequency spacing $\Delta_f$ between adjacent subcarriers of the to-be-generated OFDM signal; and the apparatus further includes a fourth determining unit, and the fourth determining unit is specifically configured to:

determine the N subcarriers in the first frequency band based on $\Delta F$ and $\Delta_f$, where $$N = \frac{\Delta F}{\Delta_f} + 1.$$

In a possible implementation, the first determining unit is specifically configured to:

determine, based on a second preset condition and $\Delta F$, K subcarriers with a highest frequency and K subcarriers with a lowest frequency on the bandwidth B, where K is a positive integer less than $$\frac{M}{2},$$

and M is a total quantity of subcarriers included in the to-be-generated OFDM signal; and determine, as the P second subcarriers, the K subcarriers with the highest frequency and the K subcarriers with the lowest frequency on the bandwidth B, where P=2K.

In a possible implementation, the first determining unit is specifically configured to:

determine a second frequency band based on the first frequency band, where the second frequency band is one or more continuous frequency segments in the bandwidth B, and the second frequency band is a complementary set of the first frequency band for the bandwidth B;

determine, based on a second preset condition and $\Delta F$, K subcarriers with a highest frequency and K subcarriers with a lowest frequency on the second frequency band; and

determine, as the P second subcarriers, the K subcarriers with the highest frequency and the K subcarriers with the lowest frequency on the second frequency band, where P=2K.

In a possible implementation, the second preset condition is:

$$1 \le K \le \left\lfloor \frac{B - \Delta F}{2 * \Delta f} \right\rfloor,$$

where B is the bandwidth of the to-be-generated OFDM signal, $\Delta_f$ is the frequency spacing between the adjacent subcarriers of the to-be-generated OFDM signal, $\Delta F$ is the bandwidth of the first frequency band, and $\lfloor \bullet \rfloor$ is a rounding-down operation.

According to a third aspect, an embodiment of the present invention provides an OFDM signal-based ranging measurement and positioning method, applied to a transmitter. The method may include:

sending an OFDM signal, where the OFDM signal is generated according to any method according to the first aspect; and after receiving a feedback message sent by a receiver for the OFDM signal, determining a distance and/or a location of a target based on content of the feedback message.

According to a fourth aspect, an embodiment of the present invention provides an OFDM signal-based ranging measurement and positioning method, applied to a receiver. The method may include:

receiving an OFDM signal sent by a transmitter, where the OFDM signal is generated according to any method according to the first aspect, and the receiver has learned initial parameter information of the OFDM signal;

determining a parameter variation of the received OFDM signal based on the initial parameter information of the OFDM signal; and determining a distance and/or a location of a target based on the parameter variation.

According to a fifth aspect, an embodiment of the present invention provides a signal transmitting apparatus. The apparatus may include:

a transceiver unit, configured to send an OFDM signal, where the OFDM signal is generated according to any method according to the first aspect; and a determining unit, configured to: after the transceiver unit receives a feedback message sent by a receiving apparatus for the OFDM signal, determine a distance and/or a location of a target based on content of the feedback message.

According to a sixth aspect, an embodiment of the present invention provides a signal receiving apparatus. The apparatus may include:

a transceiver unit, configured to receive an OFDM signal sent by a transmitting apparatus, where the OFDM signal is generated according to any method according to the first aspect, and the receiving apparatus has learned initial parameter information of the OFDM signal;

a first determining unit, configured to determine, based on the initial parameter information of the OFDM signal, a parameter variation of the OFDM signal received by the transceiver unit; and

a second determining unit, configured to determine a distance and/or a location of a target based on the parameter variation.

According to a seventh aspect, an embodiment of the present invention provides a network device. The network device includes a processor, and the processor is configured to support the network device in implementing corresponding functions in the methods provided in the first aspect, the third aspect, and the fourth aspect. The network device may further include a memory. The memory is coupled to the processor, and stores program instructions and data that are necessary for the network device. The network device may further include a communication interface, configured to implement communication between the network device and another device or a communication network.

According to an eighth aspect, an embodiment of the present invention provides a computer-readable storage medium, configured to store computer software instructions used by the processor in the apparatus provided in the second aspect, the fifth aspect, and the sixth aspect. The computer software instructions include a program designed for executing the foregoing aspects.

According to a ninth aspect, this application provides a chip system. The chip system includes a processor, configured to support a device in implementing functions in the first aspect, the third aspect, and the fourth aspect, for example, generating or processing information in the foregoing OFDM signal generation method. In a possible design, the chip system further includes a memory. The memory is configured to store program instructions and data that are required for the device. The chip system may include a chip, or may include a chip and another discrete component.

BRIEF DESCRIPTION OF DRAWINGS

To describe the technical solutions in embodiments of the present invention or in the background more clearly, the following describes the accompanying drawings for describing embodiments of the present invention or the background.

FIG. 1c is a schematic diagram of comparison between power spectral density distribution of different signals;

FIG. 2a is a schematic diagram of a ranging measurement and positioning system for an active scenario according to an embodiment of the present invention;

FIG. 2b is a schematic diagram of a ranging measurement and positioning system for a passive scenario according to an embodiment of the present invention;

FIG. 6 is a schematic diagram of a single-STA bidirectional ranging measurement procedure according to an embodiment of the present invention;

FIG. 7b is a schematic diagram of a frequency division multiplexing-based multi-STA bidirectional ranging measurement procedure according to an embodiment of the present invention;

DESCRIPTION OF EMBODIMENTS

The following describes embodiments of the present invention with reference to the accompanying drawings in embodiments of the present invention.

In the specification, claims, and accompanying drawings of this application, the terms "first", "second", "third", "fourth" and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in the specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

The following first describes some terms in this application, to facilitate understanding of a person skilled in the art.

Figure 1A:
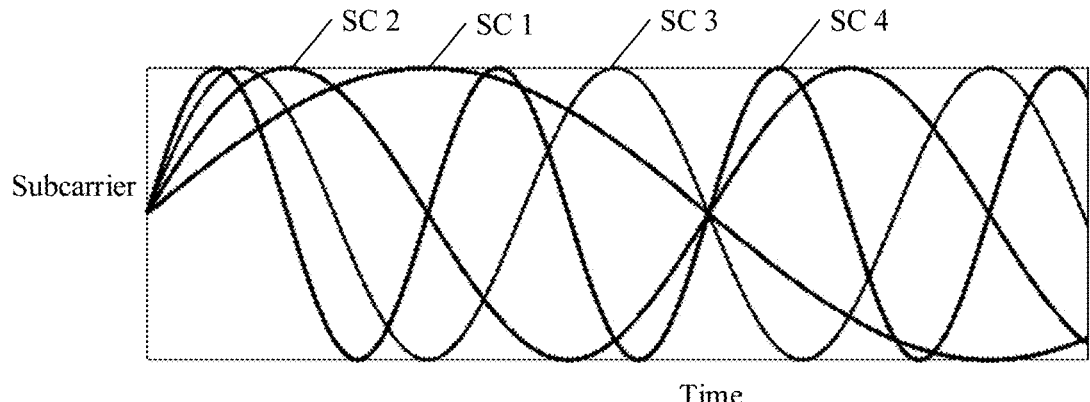
FIG. 1a is a schematic diagram of a time domain waveform of an OFDM subcarrier.
Figure 1B:
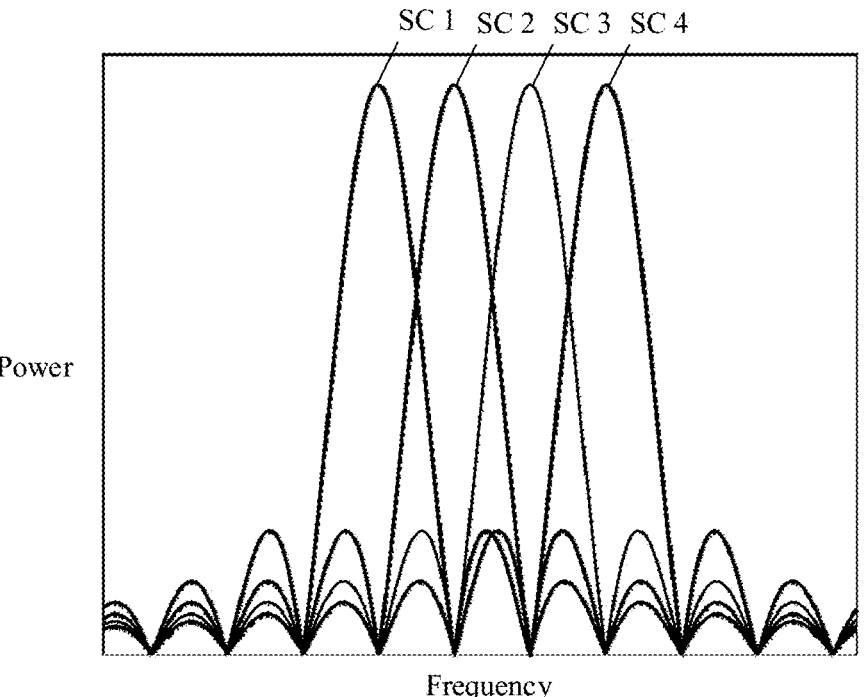
FIG. 1b is a schematic diagram of a frequency domain power spectrum of an OFDM subcarrier.

(1) Orthogonal frequency division multiplexing (Orthogonal Frequency Division Multiplexing, OFDM) is a multi-carrier transmission technology. This technology uses a large quantity of adjacent orthogonal subcarriers (Subcarrier, SC), and each subcarrier is modulated by using a conventional modulation technology (such as BPSK and QAM). Therefore, this technology has a high-rate transmission capability and can effectively resist frequency selective fading. Refer to FIG. 1a and FIG. 1b. FIG. 1a is a schematic diagram of a time domain waveform of an OFDM subcarrier, and shows time domain waveforms of four OFDM subcarriers whose frequency indexes are {1, 2, 3, 4}. FIG. 1b is a schematic diagram of a frequency domain power spectrum of an OFDM subcarrier, and shows a schematic diagram of a frequency domain power spectrum of a corresponding subcarrier when a frequency domain value of the subcarrier is 1+0 j. In embodiments of the present invention, an OFDM signal is generated and used in a ranging measurement and positioning scenario, to resolve problems of low precision and a poor range ambiguity resistance capability.

(2) Root mean square bandwidth: A root mean square bandwidth of a time domain signal s(t) is defined as follows:

$$B_{RMS} = \sqrt{\frac{\int_{-\infty}^{\infty} |S(f)|^2 f^2 df}{\int_{-\infty}^{\infty} |S(f)|^2 df}}.$$

f is a frequency, S(f) is Fourier transform (that is, a spectrum) of the time domain signal s(t), and $|S(f)|^2$ is a power spectral density of the signal. Signals with same power, a same maximum frequency, and a same minimum frequency may have different root mean square bandwidths $B_{RMS}$. FIG. 1c is a schematic diagram of comparison between power spectral density distribution of different signals. Signals A, B, and C have same power, a same maximum frequency, and a same minimum frequency, but power spectral density distribution of the signals A, B, and C is different. Therefore, root mean square bandwidths $B_{RMS}$ of the signals A, B, and C are different, and the root mean square bandwidths of the signals A, B, and C are sequentially A<B<C. When the signals have same power, a same maximum frequency, and a same minimum frequency, a signal whose power is more centrally distributed around the maximum frequency and the minimum frequency has a larger root mean square bandwidth $B_{RMS}$.

(3) Unbiased estimator: If an expected value of a sample estimated value of a parameter is equal to an actual value of the parameter, and mathematical expectation of an estimator is equal to an estimated parameter, this is referred to as unbiased estimation.

(4) A Cramer-Rao lower bound (Cramer-Rao Lower Bound, CRLB) specifies a lower bound of a variance of any unbiased estimator. The variance of any unbiased estimator needs to be greater than or equal to the lower bound. An estimator closest to the lower bound (a best case is the estimator is equal to the lower bound) is an optimal unbiased estimator. Therefore, the Cramer-Rao lower bound describes optimal performance that the unbiased estimator can achieve.

(5) A signal-to-noise ratio (Signal-Noise Ratio, SNR) indicates a ratio of signal power to noise power. A higher signal-to-noise ratio indicates less generated noise interference and higher signal quality.

First, a technical problem to be specifically resolved in this application is analyzed and proposed. In the conventional technology, a ranging measurement and positioning technology includes the following solution 1.

Solution 1: An OFDM multi-carrier phase-based ranging measurement method. FIG. 4$a$ is a schematic flowchart of the OFDM multi-carrier phase-based ranging measurement method. The method may specifically include the following steps S400 to S402.

Step S400: A transmitter sends an OFDM signal. Power of the OFDM signal is evenly distributed on all subcarriers in an entire frequency band (that is, a bandwidth).

Step S401: A receiver receives the OFDM signal and detects a parameter variation of the signal.

Step S402: The receiver determines a distance based on the parameter variation.

The solution 1 has the following disadvantages.

Disadvantage 1: Ranging measurement precision is low. The power of the OFDM signal is evenly distributed on all subcarriers in the entire frequency band (that is, the bandwidth) (which is referred to as a manner A for short), and a root mean square bandwidth $B_{RMS}$ of the OFDM signal is $$\frac{1}{\sqrt{3}}$$

of a signal bandwidth (that is, smaller than the signal bandwidth). All power of the OFDM signal is allocated to a subcarrier with a lowest frequency and a subcarrier with a highest frequency (which is referred to as a manner B for short), and a root mean square bandwidth $B_{RMS}$ of the OFDM signal is equal to the signal bandwidth. It can be learned from the Cramer-Rao lower bound (Cramer-Rao Lower Bound, CRLB) that the root mean square bandwidth in the manner A is less than the root mean square bandwidth in the manner B. Therefore, ranging measurement precision in the manner A is lower than ranging measurement precision in the manner B.

Disadvantage 2: A range ambiguity resistance capability is low. A frequency spacing between any two subcarriers (i, j) in the OFDM signal is $|i-j|\Delta_f$, and a maximum unambiguous range corresponding to the frequency spacing is $$\frac{c}{|i-j|\Delta f},$$

where c is a signal propagation speed, and |•| is an absolute value operation. It can be learned that a maximum unambiguous range corresponding to a pair of subcarriers with a larger frequency spacing is smaller; and on the contrary, a maximum unambiguous range corresponding to a pair of subcarriers with a smaller frequency spacing is larger. In the current solution, power is allocated on an entire bandwidth (that is, all frequencies carry signal power). As a result, a maximum unambiguous range of a signal is small. Therefore, a range ambiguity resistance capability is low in this solution.

To resolve problems of low precision and a poor range ambiguity resistance capability in a current OFDM-based ranging measurement and positioning technology, and improve ranging measurement and positioning precision and a range ambiguity resistance capability, disadvantages in the conventional technology are comprehensively considered, and technical problems to be actually resolved in this application include the following aspects.

1. Larger root mean square bandwidth (the disadvantage 1 of the solution 1). The OFDM-based ranging measurement and positioning technology is widely used, which partially meets requirements of ranging measurement and positioning. Ranging measurement and positioning precision may be described by using a Crame-Rao lower bound (Cramer-Rao lower bound, CRLB). However, based on the CRLB, under a condition of white Gaussian noise, a lower bound of precision δ of ranging measurement and positioning performed by using a signal s(t) is inversely proportional to a root mean square bandwidth of s(t), and is also inversely proportional to a square root of a signal-to-noise ratio (Signal-Noise Ratio, SNR), that is, $$\delta \geq \frac{\alpha}{\sqrt{SNR \cdot B_{RMS}}}.$$

α is a constant, $B_{RMS}$ is the root mean square bandwidth of the signal s(t), and SNR is the signal-to-noise ratio of the signal s(t).

Therefore, to resolve a problem of low ranging measurement and positioning precision, a root mean square bandwidth of a received signal may be increased, to obtain higher ranging measurement and positioning precision. In the solution, power of the OFDM signal is evenly distributed on all subcarriers in an entire frequency band (that is, a bandwidth), and a root mean square bandwidth $B_{RMS}$ of the OFDM signal is small, thereby resulting in low ranging measurement and positioning precision. Therefore, when a signal bandwidth is fixed and signal power is fixed, a method for obtaining a larger root mean square bandwidth is required, to improve ranging measurement and positioning precision.

2. Subcarrier pair with a smaller frequency spacing (the disadvantage 2 of the solution 1). In the OFDM-based ranging measurement and positioning technology, because power is evenly distributed on all subcarriers in an entire frequency band (that is, a bandwidth), a frequency spacing $|i-j|\Delta_f$ between any two subcarriers is excessively large, and may even be equal to a bandwidth of the OFDM signal (that is, when the two subcarriers have a highest frequency and a lowest frequency respectively). A maximum unambiguous range corresponding to a pair of subcarriers with a larger frequency spacing is smaller. On the contrary, a maximum unambiguous range of a subcarrier pair with a smaller frequency spacing is larger. Therefore, when a signal bandwidth is fixed and a signal power is fixed, a method for determining one or more pairs of subcarrier pairs with a smaller frequency spacing is required, to improve a range ambiguity resistance capability of the ranging measurement and positioning method.

In conclusion, the conventional OFDM-based ranging measurement and positioning technology cannot meet higher requirements of high precision and a strong range ambiguity resistance capability. Therefore, according to an OFDM signal generation method provided in this application, when an OFDM signal is used in a ranging measurement and positioning scenario, the foregoing technical problems can be resolved.

To better understand the solutions of this application, the following first briefly describes a scenario in which an OFDM signal generated according to embodiments of this application is used for ranging measurement and positioning.

The OFDM signal generated according to embodiments of this application may be used to perform ranging measurement (ranging measurement) and positioning on a target object. A typical method is to estimate propagation time of the OFDM signal in the air, and obtain a corresponding target distance through calculation based on the propagation time and a propagation speed of the OFDM signal. The target object may be active or passive.

In a scenario of performing ranging measurement and positioning on an active target object, the active target object may be used as a transmitter or a receiver of the OFDM signal to transmit or receive a radio signal. FIG. 2a is a schematic diagram of a ranging measurement and positioning system for an active scenario according to an embodiment of the present invention. In the active scenario, one or more transmitters and one or more receivers may exist. The transmitter and the receiver may be access points (Access Point, AP), base stations (Base Station, BS), stations (Station, STA), terminal devices (User Equipment, UE), and the like. In a type 1 shown in FIG. 2a, an access network device may be used as a transmitter, and a terminal device may be used as a receiver. In a type 2 shown in FIG. 2a, an access network device may be used as a receiver, and a terminal device may be used as a transmitter.

However, in a scenario of performing ranging measurement and positioning on a passive target object, the passive target object reflects an OFDM signal sent by a transmitter, and a receiver receives the OFDM signal reflected by the passive target object. FIG. 2b is a schematic diagram of a ranging measurement and positioning system for a passive scenario according to an embodiment of the present invention. In the passive scenario, one or more devices may correspond to one or more passive target objects (people, vehicles, walls, trees, or the like). A device used for ranging measurement and positioning may be an AP, a BS, a STA, UE, or the like. The device may have both a transmitter and a receiver (for example, a type 1 in FIG. 2b), or may have only one of a transmitter or a receiver (for example, a type 2 in FIG. 2b).

Regardless of the active scenario or the passive scenario, after propagation time from transmission to reception of the OFDM signal is determined, a distance may be calculated based on the propagation time and the propagation speed.

To better understand the OFDM signal generation method provided in embodiments of this application, the following describes a procedure of the OFDM signal generation method provided in embodiments of this application, and analyzes and resolves technical problems proposed in this application in detail.

Figure 5A:
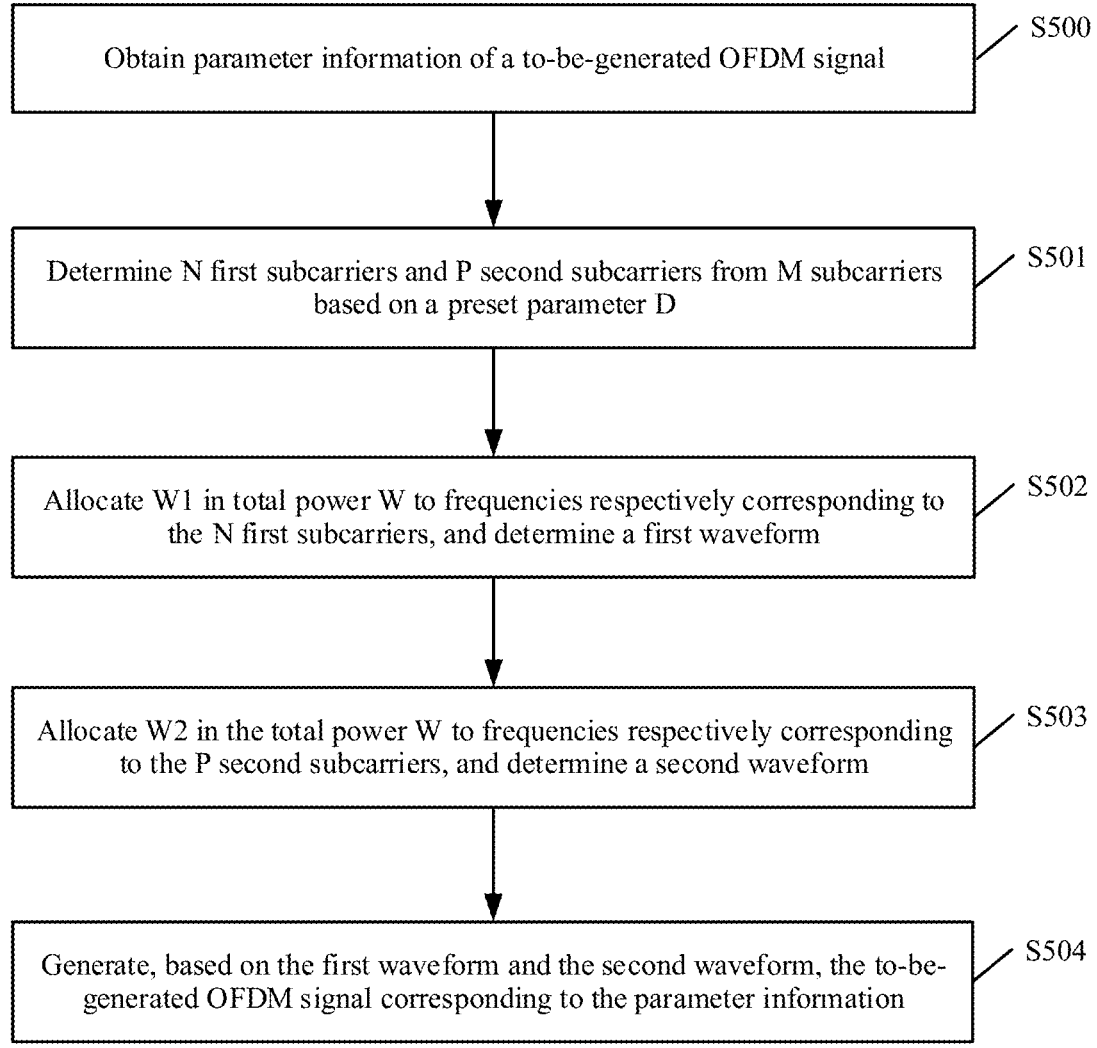
FIG. 5a is a schematic flowchart of an OFDM signal generation method according to an embodiment of the present invention.

FIG. 5a is a schematic flowchart of an OFDM signal generation method according to an embodiment of the present invention. The method may include the following steps S500 to S504.

Step S500: Obtain parameter information of a to-be-generated OFDM signal.

Specifically, before the OFDM signal is generated, the parameter information related to the OFDM signal is first obtained. The parameter information may include total power W of the OFDM signal and frequencies respectively corresponding to M subcarriers included in the OFDM signal. For example, the total power of the OFDM signal may be 10, and a total quantity M of subcarriers may be 1000. It may be understood that the total power W and the total quantity M of subcarriers may alternatively be set to other values. This is not specifically limited in this embodiment of the present invention. In addition, the parameter information may further include frequencies respectively corresponding to the foregoing 1000 subcarriers. Examples are not provided herein.

Step S501: Determine N first subcarriers and P second subcarriers from the M subcarriers based on a preset parameter D.

Specifically, the parameter D is first preset, then, N subcarriers are determined, based on the preset parameter D, from the M subcarriers as the first subcarriers, and P subcarriers are determined, based on the preset parameter D, from the M subcarriers as the second subcarriers. Both N and P are positive integers less than M. For example, N may be 9, and P may be 8. It may be understood that a quantity N of the first subcarriers and a quantity P the second subcarriers may alternatively be other values, and the quantity N and the quantity P are specifically related to a value of D. This is not specifically limited in this embodiment of the present invention.

Optionally, the parameter information of the to-be-generated OFDM signal may further include a bandwidth B and a frequency spacing $\Delta_f$ between adjacent subcarriers. First, a small continuous frequency band (that is, a first frequency band) is determined from the entire bandwidth B based on the preset parameter D, where a bandwidth of the first frequency band may be $\Delta F$, and then all or some subcarriers in the bandwidth $\Delta F$ are determined as the first subcarriers. A specific quantity of the first subcarriers is N. $\Delta F$ meets the following condition:

$$\Delta F \le \frac{c}{D},$$

where C is a signal propagation speed.

In a possible implementation, a quantity of all subcarriers in the bandwidth $\Delta F$ is N, all the N subcarriers may be determined as the first subcarriers, and N may be determined according to the following formula:

$$N = \frac{\Delta F}{\Delta_f} + 1.$$

It may be understood that a quantity of all subcarriers in the bandwidth $\Delta F$ may be greater than N, and then only N subcarriers in the all subcarriers are determined as the first subcarriers, where N may be 2, or may be another value. This is not specifically limited in this embodiment of the present invention.

When the N first subcarriers are determined, K subcarriers with a highest frequency and K subcarriers with a lowest frequency need to be determined from the bandwidth B, and then the K subcarriers with the highest frequency and the K subcarriers with the lowest frequency (that is, 2K subcarriers) are determined as the P second subcarriers. K meets the following condition:

$$1 \le K \le \left\lfloor \frac{B - \Delta F}{2 * \Delta f} \right\rfloor.$$

B is a bandwidth of the to-be-generated OFDM signal, $\Delta_f$ is the frequency spacing between the adjacent subcarriers of the to-be-generated OFDM signal, $\Delta F$ is the bandwidth of the first frequency band, and $\lfloor \bullet \rfloor$ is a rounding-down operation.

Optionally, when the N first subcarriers are determined, a second frequency band needs to be determined from the bandwidth B based on the first frequency band (that is, the second frequency band may be a complementary set of the first frequency band for the bandwidth B), K subcarriers with a highest frequency and K subcarriers with a lowest frequency are determined from the second frequency band, and then the K subcarriers with the highest frequency and the K subcarriers with the lowest frequency (that is, 2K subcarriers) are determined as the P second subcarriers. This ensures that there is no common subcarrier in the N first subcarriers and the P second subcarriers. In other words, a subcarrier carrying signal power in one phase (that is, a first waveform) does not carry power in another phase (that is, a second waveform). Therefore, when power of the two phases is analyzed on an entire spectrum, a case in which power of a subcarrier (namely, a frequency) is excessively high does not occur. This can protect a device and meet a power limitation.

Step S502: Allocate W1 in the total power W to frequencies respectively corresponding to the N first subcarriers, and determine the first waveform.

carry no power temporarily. It may be understood that a part of the total power, that is, W1, may alternatively be set to another value. This is not specifically limited in this embodiment of the present invention.

Step S503: Allocate W2 in the total power W to frequencies respectively corresponding to the P second subcarriers, and determine the second waveform.

Figure 5B:
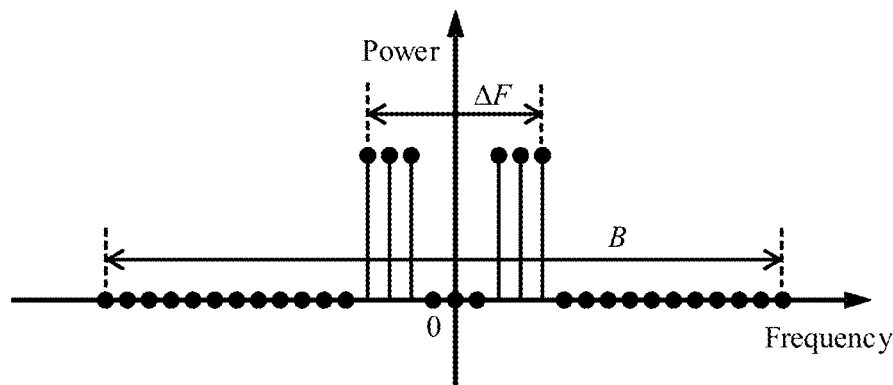
FIG. 5b is a schematic diagram of power allocation of a first waveform in an OFDM signal generation method according to an embodiment of the present invention.
Figure 5C:
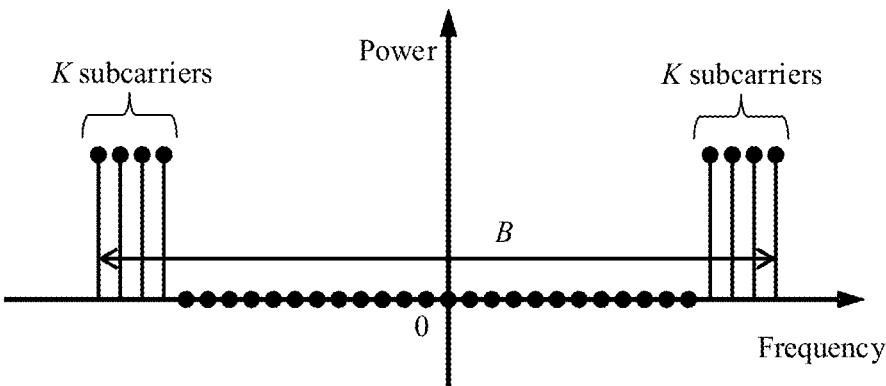
FIG. 5c is a schematic diagram of power allocation of a second waveform in an OFDM signal generation method according to an embodiment of the present invention.

Specifically, a part of the total power W of the OFDM signal, that is, W2, is adjusted, so that W2 is allocated only to the P second subcarriers, to determine a waveform of another phase, that is, the second waveform. For example, W2 may be 5. In the foregoing example, a part of the total power W, that is, 5, is allocated to the foregoing eight second subcarriers, to determine a waveform of this phase, that is, the second waveform. For a specific presentation style of the second waveform, refer to FIG. 5c. FIG. 5c is a schematic diagram of power allocation of the second waveform in the OFDM signal generation method according to an embodiment of the present invention. In this phase, a part of the total power of the signal, that is, W2, is allocated only to K subcarriers with a highest frequency and K subcarriers with a lowest frequency in the entire bandwidth B, where P=2K, and another subcarrier does not carry power temporarily. It may be understood that a part of the total power, that is, W2, may alternatively be set to another value. This is not specifically limited in this embodiment of the present invention.

Step S504: Generate, based on the first waveform and the second waveform, the to-be-generated OFDM signal corresponding to the parameter information.

Specifically, the OFDM signal including signals corresponding to waveforms of the two phases is finally generated, that is, the finally generated OFDM signal includes a signal corresponding to the first waveform and a signal corresponding to the second waveform.

For ease of understanding, the following provides a table including several OFDM signal waveform parameters as an example.

| Number | Preset parameter D (m) | First frequency band bandwidth ΔF (MHz) | Adjacent subcarrier spacing Δf (kHz) | First subcarrier number |
|---|---|---|---|---|
| 1 | 1 | 300 | 312.5 | −480, −479, . . . , +479 |
| 2 | | | 78.125 | −1920, −1919, . . . , +1919 |
| 3 | 5 | 60 | 312.5 | −96, −95, . . . , +95 |
| 4 | | | 78.125 | −384, −383, . . . , +383 |
| 5 | 10 | 30 | 312.5 | −48, −47, . . . , +47 |
| 6 | | | 78.125 | −192, −191, . . . , +191 |
| 7 | 100 | 3 | 312.5 | −4, −3, . . . , +3 |
| 8 | | | 78.125 | −19, −18, . . . , +18 |

Specifically, a part of the total power W of the OFDM signal, that is, W1, is adjusted, so that W1 is allocated only to the N first subcarriers, to determine a waveform of a phase, that is, the first waveform. For example, W1 may be 5. In the foregoing example, a part of the total power W, that is, 5, is allocated to the foregoing nine first subcarriers, to determine a waveform of this phase, that is, the first waveform. For a specific presentation style of the first waveform, refer to FIG. 5b. FIG. 5b is a schematic diagram of power allocation of the first waveform in the OFDM signal generation method according to an embodiment of the present invention. In this phase, a part of the total power W of the signal, that is, W1, is allocated only to the N subcarriers in a specific bandwidth ΔF, and subcarriers located beyond ΔF Eight parameter combinations are shown in the table. The preset parameter D may be set to 1, 5, 10, and 100 (unit: meter), the first frequency band bandwidth ΔF may be set to 3, 30, 60, and 300 (unit: MHz), the adjacent subcarrier spacing d f may be set to 78.125 and 312.5 (unit: kHz), the first subcarrier number indicates numbers of all subcarriers in the first frequency band (that is, in the bandwidth ΔF), and a quantity of numbers is a quantity of subcarriers. It should be noted that the foregoing is an example of eight parameter combinations of the first waveform, and the P second subcarriers in the second waveform may be a quantity of any value when the foregoing conditions are met. This is not specifically limited in this embodiment of the present invention.

When the OFDM signal generated by using the foregoing OFDM signal generation method is used in a ranging measurement and positioning system, because power of the OFDM signal is divided into two different phases in a targeted manner, and frequency distribution is adjusted in frequency domain of each phase, problems of a poor range ambiguity resistance capability and low ranging measurement precision in ranging measurement and positioning can be resolved. Specifically, in a waveform of one phase, power is allocated to subcarriers in a small bandwidth, so that a frequency spacing between any pair of subcarriers that carry the power is reduced, to improve the range ambiguity resistance capability of ranging measurement and positioning; and in a waveform of another phase, power is allocated to a few subcarriers with a lowest frequency and a few subcarriers with a highest frequency, to improve a root mean square bandwidth of a signal, and further improve ranging measurement and positioning precision.

To better understand why the range ambiguity resistance capability can be improved in embodiments of the present invention, a range ambiguity phenomenon is briefly described herein. First, a single-station pulse radar ranging measurement system is used as an example. It is assumed that a pulse period is T, a signal propagation speed is c, a plurality of objects exist in a ranging measurement scenario, and an actual distance of a to-be-measured target object is d. In this case, radar cannot identify which value in a plurality of distances $$d \pm k\frac{cT}{2},$$

(k=0, ±1, ±2, . . . ) is the actual distance of the to-be-measured target object. This phenomenon is referred to as range ambiguity.

$$\frac{cT}{2}$$

is referred to as a maximum unambiguity range of the radar. The maximum unambiguity range is one of the important factors that determine an effective operation range of a ranging measurement and positioning system. In a scenario in which a signal of another system (for example, a continuous wave or a sweep continuous wave) is used to perform ranging measurement and positioning, a problem of range ambiguity also exists. Range ambiguity is a problem that needs to be faced in a time-based ranging measurement and positioning method.

Figure 3:
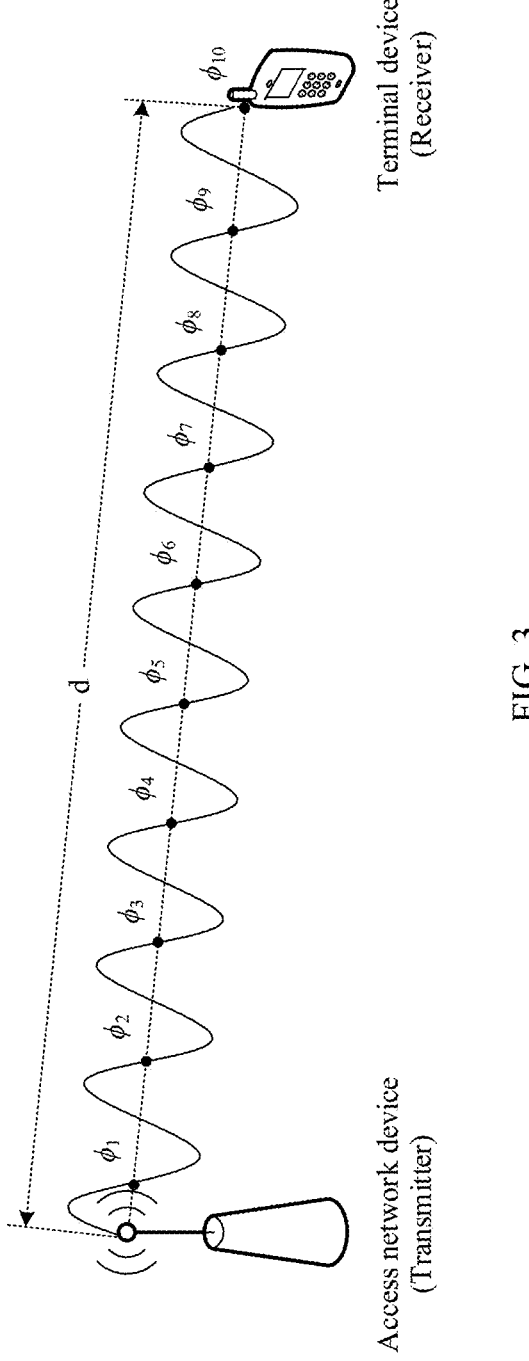
FIG. 3 is a schematic diagram of range ambiguity of a phase-based ranging measurement and positioning method according to an embodiment of the present invention.

A common method of the time-based ranging measurement and positioning method is to determine propagation time of a signal based on a variation of a phase of the signal. FIG. 3 is a schematic diagram of range ambiguity of a phase-based ranging measurement and positioning method according to an embodiment of the present invention. An access network device serves as a transmitter to send a monophonic signal (that is, a single carrier), and a terminal device serves as a receiver to receive and detect a phase $\phi$ of the monophonic signal, and then performs ranging measurement. However, because a phase of the monophonic signal is periodic (that is, a phase is always located within [0,2π), and a period is 2π), range ambiguity exists when a distance between the terminal device and the access network device is calculated by using the phase. In other words, a point that is in a plurality of points corresponding to $\phi_1 \sim \phi_{10}$ and on which the terminal device is located cannot be determined by using only the phase $\phi$. In a monophonic signal (that is, a single carrier)-based ranging measurement scenario, it is assumed that a wavelength of a carrier is and an actual distance between a target object (the terminal device) and a measurer (the access network device) is d, a set of points with range ambiguity is {d+iλ} (i=0, ±1, ±2, . . . ).

For a dual-carrier-based ranging measurement scenario, it is assumed that frequencies of two carriers are respectively $f_1$ and $f_2$, and an equivalent wavelength of the two carriers is $\overline{\lambda}$, $$\overline{\lambda} = \frac{c}{|f_1 - f_2|};$$

and if it is assumed that an actual distance between a target object and a measurer is d, a set of points with range ambiguity is {d+i$\overline{\lambda}$} (i=0, ±1, ±2, . . . ).

However, a scenario in which an OFDM signal is used for ranging measurement is an extension of the dual-carrier-based ranging measurement scenario. Therefore, when all subcarriers in the OFDM signal carry power, a frequency spacing between any pair of subcarriers that carry the power is large, and even can be equal to a signal bandwidth. In this case, an equivalent wavelength of the subcarriers is reduced, and a range ambiguity phenomenon is more likely to occur. In view of this, in embodiments of the present invention, power of a phase is allocated to a subcarrier in a small bandwidth, so that a frequency spacing between any pair of subcarrier pairs that carry the power is reduced, to improve a range ambiguity resistance capability of ranging measurement and positioning.

Figures 4A, 4B:
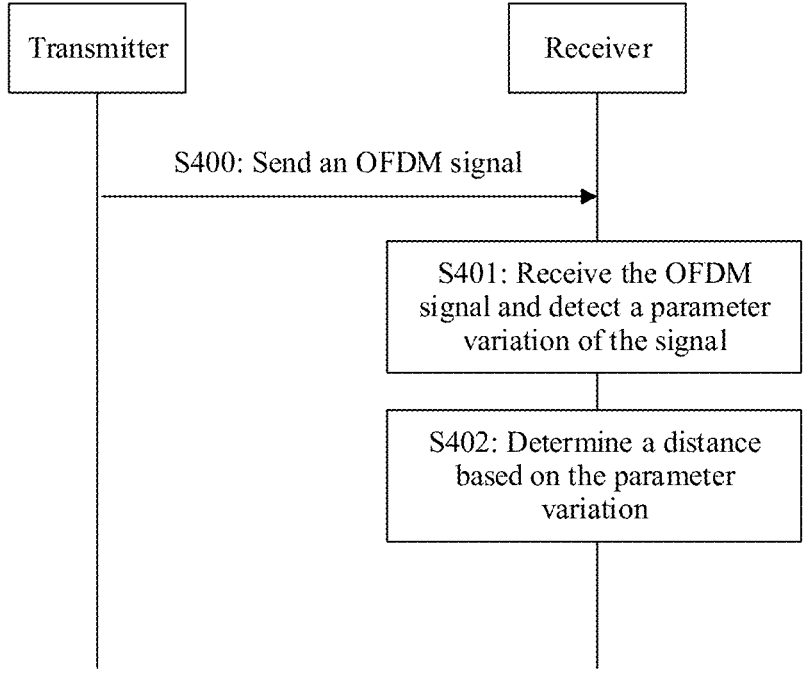
FIG. 4a is a schematic flowchart of an OFDM multi-carrier phase-based ranging measurement method.
FIG. 4b is a schematic diagram of a relationship between a phase variation of a subcarrier and a frequency in OFDM multi-carrier phase-based ranging measurement according to an embodiment of the present invention.

It should be noted that, when the OFDM signal generated by using the foregoing OFDM signal generation method is used in a ranging measurement and positioning system, because a maximum value ΔF of a frequency difference of any subcarrier pair is limited in the first waveform, it is ensured that range ambiguity does not exist when ranging measurement is performed within an operation range D (unit: m). In other words, a range ambiguity resistance capability of the first waveform in ranging measurement and positioning is ensured. In the second waveform, a distribution status of power on subcarriers is limited (that is, the power is distributed on subcarriers on left and right sides of a frequency band as much as possible), to ensure a root mean square bandwidth of the second waveform, that is, to ensure ranging measurement precision of a ranging measurement signal in this phase. A receiver in the ranging measurement and positioning system detects, based on the received first waveform, a variation {$\phi_i$} of a phase of each subcarrier of an OFDM signal relative to an initial phase (the receiver has learned the initial phase of each subcarrier of the OFDM signal), and then uses a method such as linear fitting or matched filtering on the phase variation {$\phi_i$} and a frequency of each subcarrier {$f_i$}. FIG. 4b is a schematic diagram of a relationship between a phase variation of a subcarrier and a frequency in OFDM multi-carrier phase ranging measurement according to an embodiment of the present invention. A delay (that is, propagation time of the OFDM signal) is obtained by calculating a slope of a fitted straight line, so that a ranging measurement result $d_1$ without a range ambiguity point can be calculated, and corresponding precision is $\delta_1$ (in this case, precision is low). Then, the receiver also detects a phase variation of each subcarrier based on the received second waveform, and calculates, by using the foregoing method such as linear fitting or matched filtering, a ranging measurement and positioning result set $\{d_{2,i}\}(i=1, 2, \ldots)$ including a plurality of range ambiguity points, and corresponding precision is $\delta_2$ (where $\delta_2$ is smaller than $\delta_1$, that is, precision is higher. Finally, based on a measurement method, a ranging measurement result d is selected from the ranging measurement and positioning result set $\{d_{2,i}\}(i=1, 2, \ldots)$ as a final ranging measurement and positioning result. As an example, the measurement method may be as follows: a value of $|d_{2,i}-d_1|(i=1, 2, \ldots)$ is calculated, and a minimum $d_{2,i}$ in the value of $|d_{2,i}-d_i|(i=1, 2, \ldots)$ is used as a final ranging measurement and positioning result d. It may be understood that the first waveform and the second waveform are not in a sequence in actual generation and transmission processes, that is, the transmitter may first generate and transmit the second waveform, and the receiver may first receive the second waveform.

It should be further noted that a specific fitting algorithm may be a zero forcing (Zero-Forcing, ZF) algorithm, a linear minimum mean square error (Linear Minimum Mean Square Error, LMMSE) algorithm, or the like. A linear relationship between a phase variation $\{\phi_i\}$ and a frequency $\{f_i\}$ is as follows:

$$\phi_i = -2\pi f_i \tau.$$

$\phi_i$ is the phase variation, $f_i$ is a frequency of a subcarrier i, and $-2\pi\tau$ is a slope.

For ease of understanding, in this application, a single-station (Station, STA) bidirectional ranging measurement procedure and a multi-station (Station, STA) bidirectional ranging measurement procedure are used as examples, to briefly describe a process in which a ranging measurement and positioning system performs ranging measurement by using the OFDM signal generated by using the OFDM signal generation method in this application.

For a specific single-STA bidirectional ranging measurement procedure, refer to FIG. 6. FIG. 6 is a schematic diagram of the single-STA bidirectional ranging measurement procedure according to an embodiment of the present invention. A procedure in which a single STA performs ranging measurement by using the OFDM signal generated by using the OFDM signal generation method in this application includes three phases: negotiation (negotiation), measurement (measurement), and feedback (feedback). A STA may be both a transmitter and a receiver, and an AP may also be both a transmitter and a receiver. The negotiation phase is as follows.

(1) The STA sends a sensing (sensing) request to the AP in an area.

(2) The AP that supports sensing sends an acknowledgment ACK to the STA.

The measurement phase is as follows.

(1) The AP sends a sensing NDPA to the STA, to notify the STA that a frame sent by the AP in the future is a non-data packet (NDP). It should be noted that, a frame structure of an NDPA for sensing (sensing) is the same as that of a conventional NDPA, but in the NDPA for sensing, content of a field for indication is modified for distinguishing. In addition, a subsequent OFDM waveform parameter is also indicated in the sensing NDPA. The waveform parameter includes a waveform, a bandwidth, a subcarrier spacing/offset/density, a quantity of symbols, a sequence, power, and the like. The waveform parameter may be indicated by using an index or a parameter value storage manner.

(2) The AP sends a DL sensing NDP to the STA. The DL sensing NDP includes the following three parts: a preamble (a legacy preamble in FIG. 6) of an existing protocol, a symbol of a first waveform (a waveform-1 in FIG. 6), and a symbol of a second waveform (a waveform-2 in FIG. 6), where the waveform-1 and the waveform-2 include at least one OFDM symbol. Therefore, only a frame needs to be generated based on an existing protocol to generate the sensing NDP. A unique difference is that a data OFDM symbol part after a preamble part is replaced with an OFDM symbol corresponding to the first waveform and an OFDM symbol corresponding to the second waveform. In addition, symbol parameters of the waveform-1 and the waveform-2 may be indicated in the sensing NDPA.

(3) The STA sends a UL sensing NDP to the AP. For a process of generating the UL sensing NDP, refer to the foregoing process of generating the DL sensing NDP.

The feedback phase is as follows.

(1) The AP sends a sensing feedback to the STA. Content in the feedback includes an OFDM phase change measurement result $\{\phi_i\}$ on an AP side. After receiving the feedback message from the AP, the STA may calculate an actual distance between the STA and the AP.

(2) (Optional) The STA responds with an ACK. Optionally, the STA may also feed back a ranging measurement result to the AP.

When the OFDM signal generated by using the OFDM signal generation method provided in this application is used in the foregoing single-STA bidirectional ranging measurement procedure, because waveforms of two phases are set, a distribution status of the power of the OFDM signal in frequency domain of each phase is adjusted, so that a range ambiguity resistance capability and precision of ranging measurement can be improved.

Figure 7A:
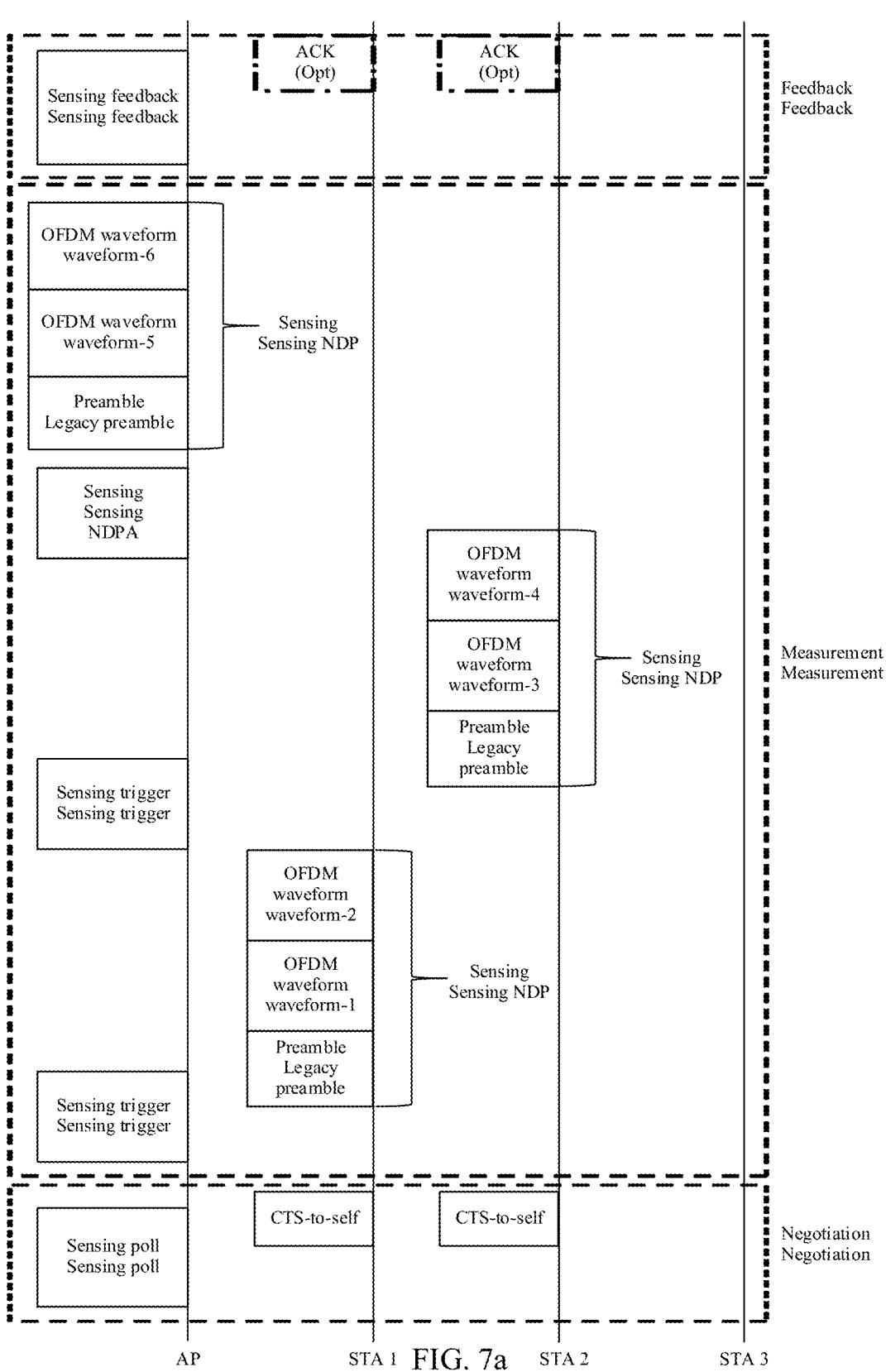
FIG. 7a is a schematic diagram of a time division multiplexing-based multi-STA bidirectional ranging measurement procedure according to an embodiment of the present invention.

For a specific multi-STA bidirectional ranging measurement procedure, refer to FIG. 7a. FIG. 7a is a schematic diagram of a time division multiplexing-based multi-STA bidirectional ranging measurement procedure according to an embodiment of the present invention. A procedure in which a plurality of STAs perform ranging measurement by using the OFDM signal generated by using the OFDM signal generation method in this application includes three phases: polling (polling), measurement (measurement), and feedback (feedback). A STA may be both a transmitter and a receiver, and an AP may also be both a transmitter and a receiver. The polling phase is as follows.

(1) The AP sends a sensing poll to initiate polling. It should be noted that, a frame structure of a poll for sensing (sensing) is the same as that of a conventional poll, but in the poll for sensing, an indication bit in a frame header is modified for distinguishing.

(2) One or more STAs that agree to participate in sensing and ranging measurement reply with a CTS-to-self to the AP, to reply with the sensing poll.

The measurement phase is as follows.

(1) The AP sends a sensing trigger to trigger one STA to send a sensing NDP. It should be noted that, a frame structure of an NDPA for sensing (sensing) is the same as that of a conventional NDPA, but in the NDPA for sensing, content of a field for indication is modified for distinguishing. In addition, a subsequent OFDM waveform parameter is also indicated in the sensing trigger. The waveform parameter includes a waveform, a bandwidth, a subcarrier spacing/offset/density, a quantity of symbols, a sequence, power, and the like. The waveform parameter may be indicated by using an index or a parameter value storage manner.

(2) The triggered STA sends a UL sensing NDP to the AP. The DL sensing NDP includes the following three parts: a preamble (a legacy preamble in FIG. 7a) of an existing protocol, a symbol of a first waveform (a waveform-1, a waveform-3, and a waveform-5 in FIG. 7a), and a symbol of a second waveform (a waveform-2, a waveform-4, and a waveform-6 in FIG. 7a), where the waveform-1 to the waveform-6 each include at least one OFDM symbol. For a specific manner of generating the DL sensing NDP, refer to the manner of generating the UL sensing NDP in the foregoing single-STA ranging measurement procedure. In addition, symbol parameters of the waveform-1 to the waveform-6 may be indicated in the sensing trigger by using an index and a predefined table, or by storing a parameter value in a specific field.

(3) The foregoing process of triggering the STA by the AP occurs for a plurality of times, and one STA is triggered each time. The triggered STA sends the UL sensing NDP, that is, STAs participating in sensing are sequentially triggered in a time division multiplexing manner to send the UL sensing NDP.

(4) The AP sends a sensing NDPA to the STA, to notify the STA that a DL sensing NDP is to be sent.

(5) The AP sends the DL sensing NDP to the STA. For a process of generating the DL sensing NDP, refer to the foregoing process of generating the UL sensing NDP.

The feedback phase is as follows.

(1) The AP sends a sensing feedback to the STA. Content in the feedback includes an OFDM phase change measurement result $\{\phi_i\}$ on an AP side. After receiving the feedback message from the AP, the STA may calculate an actual distance between the STA and the AP.

(2) (Optional) The STA sends an ACK to the AP. Optionally, the STA may also feed back a ranging measurement result to the AP.

It should be noted that the waveform-1 and the waveform-2 in FIG. 7a respectively correspond to the first waveform and the second waveform. Similarly, the waveform-3 and the waveform-4 respectively correspond to the first waveform and the second waveform, and the waveform-5 and the waveform-6 respectively correspond to the first waveform and the second waveform. There is no fixed requirement on a sequence of generating and sending the first waveform and the second waveform.

When the OFDM signal generated by using the OFDM signal generation method provided in this application is used in the foregoing time division multiplexing-based multi-STA bidirectional ranging measurement procedure, because waveforms of two phases are set, a distribution status of the power of the OFDM signal in frequency domain of each phase is adjusted, so that a range ambiguity resistance capability and precision of ranging measurement can be improved.

For another specific multi-STA bidirectional ranging measurement procedure, refer to FIG. 7b. FIG. 7b is a schematic diagram of a frequency division multiplexing-based multi-STA bidirectional ranging measurement procedure according to an embodiment of the present invention. A procedure in which a plurality of STAs perform ranging measurement by using the OFDM signal generated by using the OFDM signal generation method in this application includes three phases: polling (polling), measurement (measurement), and feedback (feedback). A STA may be both a transmitter and a receiver, and an AP may also be both a transmitter and a receiver. The polling phase is as follows.

(1) The AP sends a sensing poll to initiate polling. It should be noted that, a frame structure of a poll for sensing (sensing) is the same as that of a conventional poll, but in the poll for sensing, an indication bit in a frame header is modified for distinguishing.

(2) One or more STAs that agree to participate in sensing and ranging measurement reply with a CTS-to-self to the AP, to reply with the sensing poll.

The measurement phase is as follows.

(1) The AP sends a sensing trigger to trigger a plurality of STAs to send a sensing NDP. It should be noted that, a frame structure of an NDPA for sensing (sensing) is the same as that of a conventional NDPA, but in the NDPA for sensing, content of a field for indication is modified for distinguishing. In addition, a subsequent OFDM waveform parameter is also indicated in the sensing trigger. The waveform parameter includes a waveform, a bandwidth, a subcarrier spacing/offset/density, a quantity of symbols, a sequence, power, and the like. The waveform parameter may be indicated by using an index or a parameter value storage manner.

(2) The triggered plurality of STAs simultaneously send a UL sensing NDP to the AP in a frequency division multiplexing manner. The DL sensing NDP includes the following three parts: a preamble (a legacy preamble in FIG. 7b) of an existing protocol, a symbol of a first waveform (a waveform-1, a waveform-3, and a waveform-5 in FIG. 7b), and a symbol of a second waveform (a waveform-2, a waveform-4, and a waveform-6 in FIG. 7b), where the waveform-1 to the waveform-6 each include at least one OFDM symbol. For a specific manner of generating the DL sensing NDP, refer to the manner of generating the UL sensing NDP in the foregoing single-STA ranging measurement procedure. In addition, symbol parameters of the waveform-1 to the waveform-6 may be indicated in the sensing trigger by using an index and a predefined table, or by storing a parameter value in a specific field.

(3) The AP sends a sensing NDPA to the STA, to notify the STA that a DL sensing NDP is to be sent.

(4) The AP sends the DL sensing NDP to the STA. For a process of generating the DL sensing NDP, refer to the foregoing process of generating the UL sensing NDP.

The feedback phase is as follows.

(1) The AP sends a sensing feedback to the STA. Content in the feedback includes an OFDM phase change measurement result $\{\phi_i\}$ on an AP side. After receiving the feedback message from the AP, the STA may calculate an actual distance between the STA and the AP.

(2) (Optional) The STA sends an ACK to the AP. Optionally, the STA may also feed back a ranging measurement result to the AP.

It should be noted that the waveform-1 and the waveform-2 in FIG. 7b respectively correspond to the first waveform and the second waveform. Similarly, the waveform-3 and the waveform-4 respectively correspond to the first waveform and the second waveform, and the waveform-5 and the waveform-6 respectively correspond to the first waveform and the second waveform. There is no fixed requirement on a sequence of generating and sending the first waveform and the second waveform.

When the OFDM signal generated by using the OFDM signal generation method provided in this application is used in the foregoing frequency division multiplexing-based multi-STA bidirectional ranging measurement procedure, because waveforms of two phases are set, a distribution status of the power of the OFDM signal in frequency domain of each phase is adjusted, so that a range ambiguity resistance capability and precision of ranging measurement can be improved.

It should be noted that embodiments of the present invention may be applied to various devices that support a ranging measurement function, the devices include various BSs, UEs, APs, and STA devices, and the devices may be specifically base stations (NodeB, eNodeB, or gNodeB), wireless routers, mobile phones, tablets, laptops, desktop computers, televisions, smart speakers, electronic locks, internet of things (Internet of Things, IoT) devices, automated guided vehicles (Automated Guided Vehicle, AGV), unmanned aerial vehicles, vehicles, and the like.

For the two technical problems that need to be actually resolved in this application, that is, problems of a poor range ambiguity resistance capability and low precision that exist when ranging measurement and positioning is performed by using an OFDM signal generated in a conventional power allocation manner, in embodiments of the present invention, a phased OFDM ranging measurement signal (including a waveform signal in a first waveform and a waveform signal in a second waveform) is generated, and a distribution status of signal power on subcarriers in each phase is adjusted, to resolve the problems of the poor range ambiguity resistance capability and the low precision. Specifically, in the first waveform, distribution of signal power is adjusted, so that the signal power is distributed only on subcarriers in a bandwidth of the first waveform (that is, $\Delta F$), and $\Delta F$ may be determined by a ranging measurement range (that is, the preset parameter D) required in a specific scenario. This improves a range ambiguity resistance capability of ranging measurement and positioning. In the second waveform, signal power is distributed only on K subcarriers with a lowest frequency and K subcarriers with a highest frequency (K may be determined by a signal parameter such as a bandwidth B, an adjacent subcarrier spacing $\Delta_f$, and the bandwidth of the first waveform F), to increase a root mean square bandwidth of the signal, and further improve ranging measurement precision of the signal.

Therefore, when the OFDM signal generated by using the OFDM signal generation method provided in this application is used in a ranging measurement and positioning system, a problem that a conventional OFDM waveform has a poor range ambiguity resistance capability and low ranging measurement precision in a ranging measurement and positioning process can be resolved.

In conclusion, this application overcomes disadvantages of a conventional ranging measurement and positioning technology, such as a poor range ambiguity resistance capability and low ranging measurement precision.

It should be noted that the OFDM signal generation method provided in this application may be applied to the ranging measurement and positioning system, or may be applied to another communication system. This is not specifically limited herein.

The methods in embodiments of the present invention are described in detail above, and a related apparatus in embodiments of the present invention is provided below.

Figure 8:
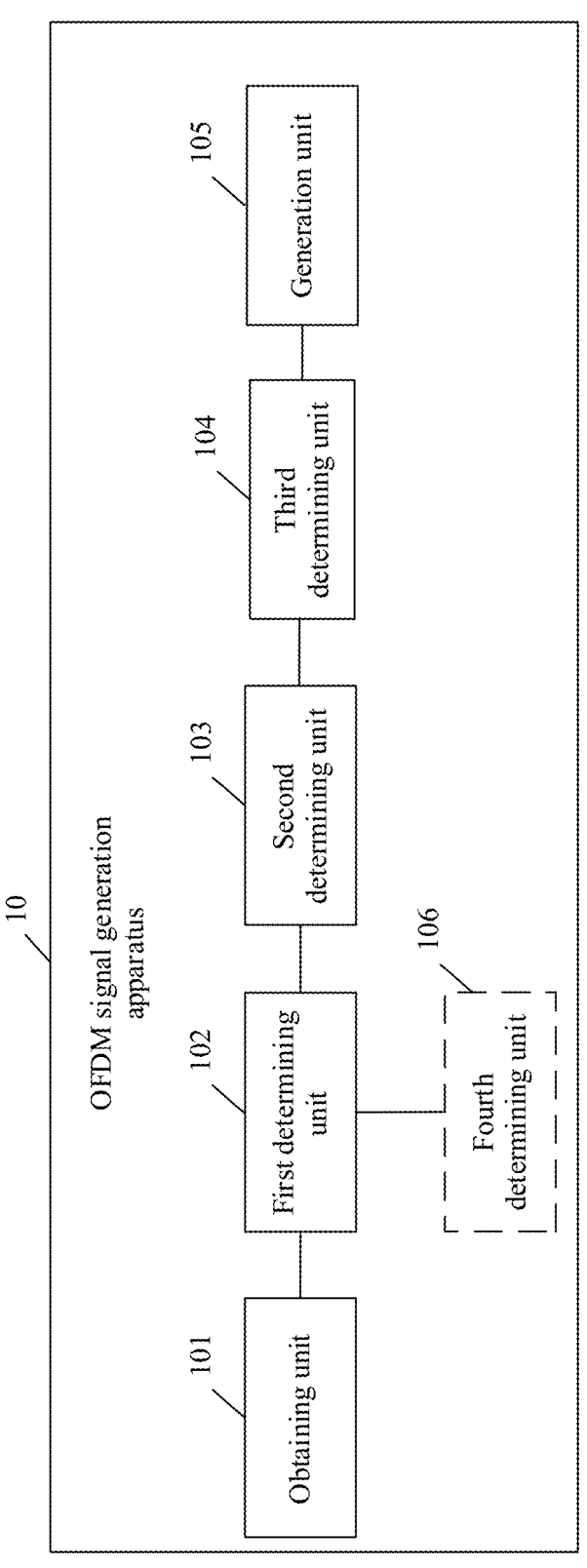
FIG. 8 is a schematic diagram of a structure of an OFDM signal generation apparatus according to an embodiment of the present invention.

FIG. 8 is a schematic diagram of a structure of an OFDM signal generation apparatus according to an embodiment of the present invention. An OFDM signal generation apparatus 10 may include an obtaining unit 101, a first determining unit 102, a second determining unit 103, a third determining unit 104, and a generation unit 105. Detailed descriptions of the units are as follows.

The obtaining unit 101 is configured to obtain parameter information of a to-be-generated OFDM signal, where the parameter information includes total power W of the to-be-generated OFDM signal and frequencies respectively corresponding to M subcarriers included in the to-be-generated OFDM signal.

The first determining unit 102 is configured to determine N first subcarriers and P second subcarriers from the M subcarriers based on a preset parameter D, where both N and P are positive integers less than M.

The second determining unit 103 is configured to: allocate W1 in the total power W to frequencies respectively corresponding to the N first subcarriers, and determine a first waveform.

The third determining unit is configured to: allocate W2 in the total power W to frequencies respectively corresponding to the P second subcarriers, and determine a second waveform, where W=W1+W2.

The generation unit is configured to generate, based on the first waveform and the second waveform, the to-be-generated OFDM signal corresponding to the parameter information, where the to-be-generated OFDM signal includes a signal corresponding to the first waveform and a signal corresponding to the second waveform.

In a possible implementation, the parameter information further includes a bandwidth B of the to-be-generated OFDM signal; and the first determining unit 102 is specifically configured to:

determine a first frequency band based on the preset parameter D, where the first frequency band is a continuous frequency segment on the bandwidth B of the to-be-generated OFDM signal;

determine N subcarriers in the first frequency band as the N first subcarriers; and determine the P second subcarriers based on the first frequency band and the bandwidth B of the to-be-generated OFDM signal.

In a possible implementation, the first determining unit 102 is specifically configured to:

determine a bandwidth $\Delta F$ of the first frequency band based on a first preset condition and the preset parameter D; and determine, as the first frequency band, a frequency band with a frequency spacing of $\Delta F$ between a subcarrier with a highest frequency and a subcarrier with a lowest frequency in any frequency band on the bandwidth B.

In a possible implementation, the first preset condition is:

$$\Delta F \le \frac{c}{D},$$

where C is a signal propagation speed, D is the preset parameter D, and $\Delta F$ is the bandwidth of the first frequency band.

In a possible implementation, the parameter information further includes a frequency spacing $\Delta_f$ between adjacent subcarriers of the to-be-generated OFDM signal; and the apparatus further includes a fourth determining unit 106, and the fourth determining unit 106 is specifically configured to:

determine the N subcarriers in the first frequency band based on $\Delta F$ and $\Delta_f$, where $$N = \frac{\Delta F}{\Delta_f} + 1.$$

In a possible implementation, the first determining unit 102 is specifically configured to:

determine, based on a second preset condition and ΔF, K subcarriers with a highest frequency and K subcarriers with a lowest frequency on the bandwidth B, where K is a positive integer less than $$\frac{M}{2},$$

and M is a total quantity of subcarriers included in the to-be-generated OFDM signal; and determine, as the P second subcarriers, the K subcarriers with the highest frequency and the K subcarriers with the lowest frequency on the bandwidth B, where P=2K.

In a possible implementation, the first determining unit 102 is specifically configured to:

determine a second frequency band based on the first frequency band, where the second frequency band is one or more continuous frequency segments in the bandwidth B, and the second frequency band is a complementary set of the first frequency band for the bandwidth B;

determine, based on a second preset condition and ΔF, K subcarriers with a highest frequency and K subcarriers with a lowest frequency on the second frequency band; and determine, as the P second subcarriers, the K subcarriers with the highest frequency and the K subcarriers with the lowest frequency on the second frequency band, where P=2K.

In a possible implementation, the second preset condition is:

$$1 \le K \le \left\lfloor \frac{B - \Delta F}{2 * \Delta_f} \right\rfloor,$$

where B is the bandwidth of the to-be-generated OFDM signal, $\Delta_f$ is the frequency spacing between the adjacent subcarriers of the to-be-generated OFDM signal, ΔF is the bandwidth of the first frequency band, and $\lfloor \bullet \rfloor$ is a rounding-down operation.

It should be noted that, for functions of functional units in the OFDM signal generation apparatus 10 described in this embodiment of the present invention, refer to related descriptions of the step S500 to the step S504 in the method embodiment in FIG. 5a. Details are not described herein again.

Figure 9:
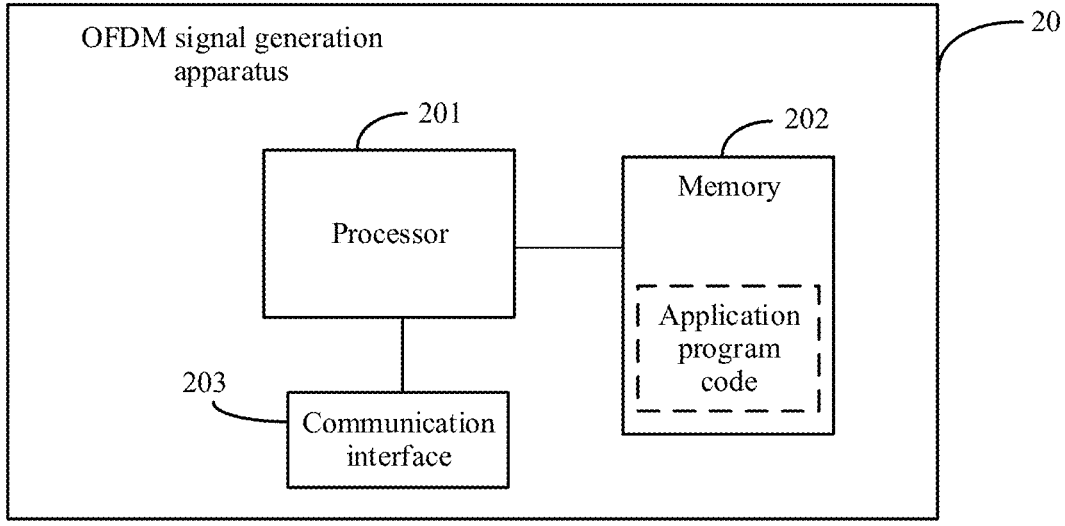
FIG. 9 is a schematic diagram of a structure of another OFDM signal generation apparatus according to an embodiment of the present invention.

FIG. 9 is a schematic diagram of a structure of another OFDM signal generation apparatus according to an embodiment of the present invention. An apparatus 20 includes at least one processor 201, at least one memory 202, and at least one communication interface 203. In addition, the apparatus may further include a general-purpose component such as an antenna. Details are not described herein.

The processor 201 may be a general-purpose central processing unit (CPU), a microprocessor, an application-specific integrated circuit (application-specific integrated circuit, ASIC), or one or more integrated circuits for controlling program execution of the foregoing solutions.

The communication interface 203 is configured to communicate with another device or a communication network, such as the Ethernet, a radio access network (RAN), a core network, or a wireless local area network (Wireless Local Area Network, WLAN).

The memory 202 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and can be accessed by a computer, but is not limited thereto. The memory may exist independently, and is connected to the processor through a bus. Alternatively, the memory may be integrated into the processor.

The memory 202 is configured to store application program code for executing the foregoing OFDM signal generation method, and the processor 201 controls execution. The processor 201 is configured to execute the application program code stored in the memory 202.

The code stored in the memory 202 may be used to execute the OFDM signal generation method provided in FIG. 5a. For example, the code may be used to obtain parameter information of a to-be-generated OFDM signal; determine N first subcarriers and P second subcarriers from the M subcarriers based on a preset parameter D; allocate W1 in total power W to frequencies respectively corresponding to the N first subcarriers, to determine a first waveform; allocate W2 in the total power W to frequencies respectively corresponding to the P second subcarriers, to determine a second waveform; and generate, based on the first waveform and the second waveform, the to-be-generated OFDM signal corresponding to the parameter information.

It should be noted that, for functions of functional units in the OFDM signal generation apparatus 20 described in this embodiment of the present invention, refer to related descriptions of the step S500 to the step S504 in the method embodiment in FIG. 5a. Details are not described herein again.

In a possible product form, a transmitter or a receiver in this embodiment of this application may be implemented by using a general bus architecture.

Figure 10:
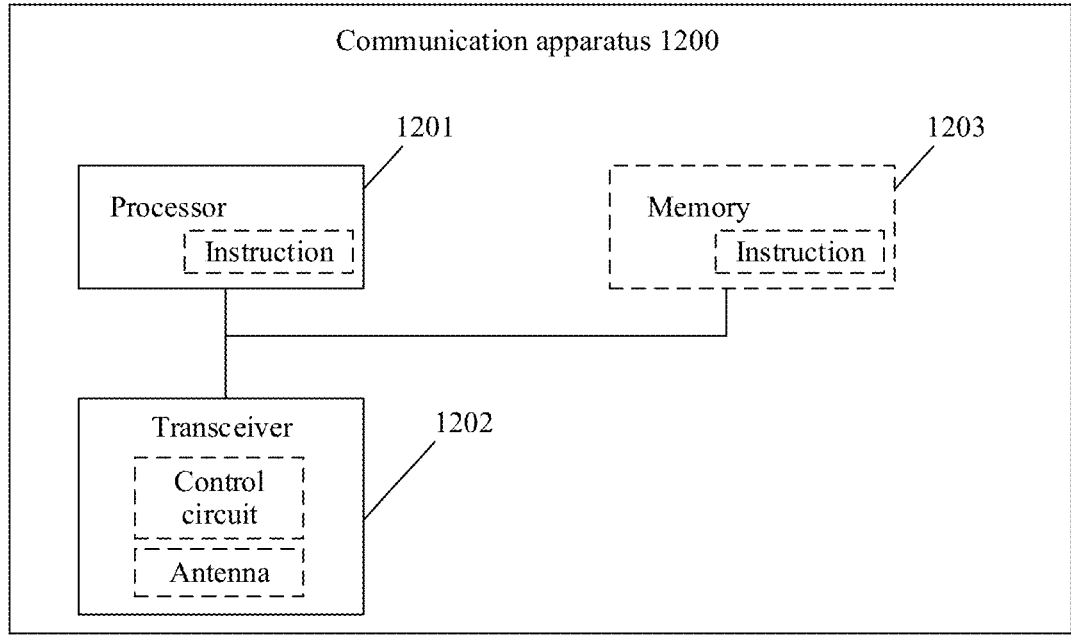
FIG. 10 is a schematic diagram of a structure of a communication apparatus 1200 according to an embodiment of this application.

For ease of description, FIG. 10 is a schematic diagram of a structure of a communication apparatus 1200 according to an embodiment of this application. The communication apparatus 1200 may be a transmitter, a receiver, or a chip in the transmitter or the receiver. FIG. 10 shows only main components of the communication apparatus 1200. In addition to a processor 1201 and a transceiver 1202, the communication apparatus may further include a memory 1203 and an input/output apparatus (not shown in the figure).

The processor 1201 is mainly configured to: process a communication protocol and communication data, control the communication apparatus, execute a software program, and process data of the software program. The memory 1203 is mainly configured to store the software program and the data. The transceiver 1202 may include a control circuit and an antenna. The control circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus is powered on, the processor 1201 may read the software program in the memory 1203, interpret and execute instructions of the software program, and process data of the software program. When data needs to be sent in a wireless manner, after performing baseband processing on the to-be-sent data, the processor 1201 outputs a baseband signal to the radio frequency circuit. After performing radio frequency processing on the baseband signal, the radio frequency circuit sends a radio frequency signal in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor 1201. The processor 1201 converts the baseband signal into data and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

The processor 1201, the transceiver 1202, and the memory 1203 may be connected through a communication bus.

In a design, the communication apparatus 1200 may be configured to perform a function of generating an OFDM signal in the foregoing embodiments. The processor 1201 may be configured to perform the steps in FIG. 5a and generate a corresponding OFDM signal, and/or configured to perform another process of the technology described in this specification. The transceiver 1202 may be configured to receive and send the OFDM signal generated in FIG. 5a, and/or configured to perform another process of the technology described in this specification.

In another design, the communication apparatus 1200 may be configured to perform a function of a single-STA ranging measurement service in the foregoing embodiments. The processor 1201 may be configured to generate a message sent in each step in FIG. 6, and/or configured to perform another process of the technology described in this specification. The transceiver 1202 may be configured to receive and send a message in each step in FIG. 6, and/or configured to perform another process of the technology described in this specification.

In another design, the communication apparatus 1200 may be configured to perform a function of a multi-STA ranging measurement service in the foregoing embodiments. The processor 1201 may be configured to generate a message sent in each step in FIG. 7a, and/or configured to perform another process of the technology described in this specification. The transceiver 1202 may be configured to receive and send a message in each step in FIG. 7a, and/or configured to perform another process of the technology described in this specification.

In another design, the communication apparatus 1200 may be configured to perform a function of a multi-STA ranging measurement service in the foregoing embodiments.

The processor 1201 may be configured to generate a message sent in each step in FIG. 7b, and/or configured to perform another process of the technology described in this specification. The transceiver 1202 may be configured to receive and send a message in each step in FIG. 7b, and/or configured to perform another process of the technology described in this specification.

In any one of the foregoing designs, the processor 1201 may include a transceiver configured to implement receiving and sending functions. For example, the transceiver may be a transceiver circuit, an interface, or an interface circuit. The transceiver circuit, the interface, or the interface circuit that are configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1201 may store instructions. The instructions may be a computer program. The computer program is run on the processor 1201, to enable the communication apparatus 1200 to perform the method described in any one of the foregoing method embodiments. The computer program may be fixed in the processor 1201. In this case, the processor 1201 may be implemented by hardware.

In an implementation, the communication apparatus 1200 may include a circuit, and the circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), or a printed circuit board (printed circuit board, PCB), an electronic device, and the like. The processor and the transceiver may alternatively be manufactured by using various IC technologies, for example, a complementary metal oxide semiconductor (complementary metal oxide semiconductor, CMOS), an N-type metal oxide semiconductor (n-type metal oxide semiconductor, NMOS), a P-type metal oxide semiconductor (P-type metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 10. The communication apparatus may be an independent device or may be a part of a large device. For example, the communication apparatus may be:

(1) an independent integrated circuit IC, a chip, or a chip system or subsystem;
  (2) a set including one or more ICs, where optionally, the set of ICs may further include a storage component configured to store data and a computer program;
  (3) an ASIC such as a modem (modem);
  (4) a module that can be embedded in another device;
  (5) a receiver, a terminal, an intelligent terminal, a cellular phone, a wireless device, a handheld device, a mobile unit, a vehicle-mounted device, a network device, a cloud device, an artificial intelligence device, or the like; or
  (6) others.

In a possible product form, a transmitter or a receiver in this embodiment of this application may be implemented by a general-purpose processor.

The general-purpose processor for implementing service paging includes a processing circuit and an input/output interface that is internally connected to the processing circuit and that communicates with the processing circuit.

In a design, the general-purpose processor may be configured to perform a function of generating an OFDM signal in the foregoing embodiments. The processing circuit may be configured to perform steps in FIG. 5a and generate a corresponding OFDM signal, and/or configured to perform another process of the technology described in this specification. The input/output interface may be configured to receive and send the OFDM signal generated in FIG. 5a, and/or configured to perform another process of the technology described in this specification.

In another design, the general-purpose processor may be configured to perform a function of a single-STA ranging measurement service in the foregoing embodiments. The processing circuit may be configured to generate a message sent in each step in FIG. 6, and/or configured to perform another process of the technology described in this specification. The input/output interface may be configured to receive and send a message in each step in FIG. 6, and/or configured to perform another process of the technology described in this specification.

In another design, the general-purpose processor may be configured to perform a function of a multi-STA ranging measurement service in the foregoing embodiments. The processing circuit may be configured to generate a message sent in each step in FIG. 7a, and/or configured to perform another process of the technology described in this specification. The input/output interface may be configured to receive and send a message in each step in FIG. 7a, and/or configured to perform another process of the technology described in this specification.

In another design, the general-purpose processor may be configured to perform a function of a multi-STA ranging measurement service in the foregoing embodiments. The processing circuit may be configured to generate a message sent in each step in FIG. 7b, and/or configured to perform another process of the technology described in this specification. The input/output interface may be configured to receive and send a message in each step in FIG. 7b, and/or configured to perform another process of the technology described in this specification.

It should be understood that the communication apparatuses in the foregoing various product forms have any function of service paging in the foregoing method embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system, including one or more of a transmitter and a receiver, and the transmitter and the receiver may perform the method in any one of the foregoing embodiments.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments of the present invention.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like, and may be specifically a processor in a computer device) to perform all or some of the steps of the methods described in embodiments of this application. The foregoing storage medium includes any medium that can store program code, such as a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application other than limiting this application. Although this application is described in detail with reference to the foregoing embodiments, a person of ordinary skill in the art should understand that modifications may still be made to the technical solutions described in the foregoing embodiments or equivalent replacements may still be made to some technical features thereof, without departing from the spirit and scope of the technical solutions of embodiments of this application.

What is claimed is:

1. A method for Orthogonal Frequency Division Multiplexing (OFDM) signal generation, comprising:

obtaining parameter information of an OFDM signal, wherein the parameter information comprises total power W of the OFDM signal and frequencies respectively corresponding to M subcarriers comprised in the OFDM signal;

determining N first subcarriers and P second subcarriers from the M subcarriers based on a preset parameter D, wherein both N and P are positive integers less than M;

allocating W1 in the total power W to frequencies respectively corresponding to the N first subcarriers, and determining a first waveform;

allocating W2 in the total power W to frequencies respectively corresponding to the P second subcarriers, and determining a second waveform, wherein W=W1+W2;

generating, based on the first waveform and the second waveform, the OFDM signal corresponding to the parameter information, wherein the OFDM signal comprises a signal corresponding to the first waveform and a signal corresponding to the second waveform; and using the OFDM signal for ranging measurement and positioning.

2. The method according to claim 1, wherein the parameter information further comprises a bandwidth B of the OFDM signal; and the determining N first subcarriers and P second subcarriers from the M subcarriers based on a preset parameter D comprises:

determining a first frequency band based on the preset parameter D, wherein the first frequency band is a continuous frequency segment on the bandwidth B of the OFDM signal;

determining N subcarriers in the first frequency band as the N first subcarriers; and determining the P second subcarriers based on the first frequency band and the bandwidth B of the OFDM signal.

3. The method according to claim 2, wherein the determining a first frequency band based on the preset parameter D comprises:

determining a bandwidth $\Delta F$ of the first frequency band based on a first preset condition and the preset parameter D; and determining, as the first frequency band, a frequency band with a frequency spacing of $\Delta F$ between a subcarrier with a highest frequency and a subcarrier with a lowest frequency on the bandwidth B.

4. The method according to claim 3, wherein the first preset condition is:

$$\Delta F \le \frac{c}{D},$$

wherein C is a signal propagation speed, D is the preset parameter D, and $\Delta F$ is the bandwidth of the first frequency band.

5. The method according to claim 3, wherein the parameter information further comprises a frequency spacing $\Delta_f$ between adjacent subcarriers of the OFDM signal, and the method further comprises:

determining the N subcarriers in the first frequency band based on $\Delta F$ and $\Delta_f$, wherein $$N = \frac{\Delta F}{\Delta f} + 1.$$

6. The method according to claim 3, wherein the determining the P second subcarriers based on the first frequency band and the bandwidth B of the OFDM signal comprises:

determining, based on a second preset condition and $\Delta F$, K subcarriers with a highest frequency and K subcarriers with a lowest frequency on the bandwidth B, wherein K is a positive integer less than $$\frac{M}{2},$$

and M is a total quantity of subcarriers comprised in the OFDM signal; and determining, as the P second subcarriers, the K subcarriers with the highest frequency and the K subcarriers with the lowest frequency on the bandwidth B, wherein P=2K.

7. The method according to claim 6, wherein the second preset condition is:

$$1 \le K \le \left\lfloor \frac{B - \Delta F}{2 * \Delta f} \right\rfloor,$$

wherein B is the bandwidth of the OFDM signal, $\Delta_f$ is the frequency spacing between adjacent subcarriers of the OFDM signal, $\Delta F$ is the bandwidth of the first frequency band, and $\lfloor \cdot \rfloor$ is a rounding-down operation.

8. The method according to claim 3, wherein the determining the P second subcarriers based on the first frequency band and the bandwidth B of the OFDM signal comprises:

determining a second frequency band based on the first frequency band, wherein the second frequency band is one or more continuous frequency segments in the bandwidth B, and the second frequency band is a complementary set of the first frequency band for the bandwidth B;

determining, based on a second preset condition and $\Delta F$, K subcarriers with a highest frequency and K subcarriers with a lowest frequency on the second frequency band; and determining, as the P second subcarriers, the K subcarriers with the highest frequency and the K subcarriers with the lowest frequency on the second frequency band, wherein P=2K.

9. An apparatus for Orthogonal Frequency Division Multiplexing (OFDM) signal generation, comprising:

one or more processors; and one or more memories coupled to the one or more processors and storing programming instructions for execution by the one or more processors to cause the apparatus to perform operations comprising:

obtaining parameter information of an OFDM signal, wherein the parameter information comprises total power W of the OFDM signal and frequencies respectively corresponding to M subcarriers comprised in the OFDM signal;

determining N first subcarriers and P second subcarriers from the M subcarriers based on a preset parameter D, wherein both N and P are positive integers less than M;

allocating W1 in the total power W to frequencies respectively corresponding to the N first subcarriers, and determine a first waveform;

allocating W2 in the total power W to frequencies respectively corresponding to the P second subcarriers, and determine a second waveform, wherein W=W1+W2;

generating, based on the first waveform and the second waveform, the OFDM signal corresponding to the parameter information, wherein the OFDM signal comprises a signal corresponding to the first waveform and a signal corresponding to the second waveform; and using the OFDM signal for ranging measurement and positioning.

10. The apparatus according to claim 9, wherein the parameter information further comprises a bandwidth B of the OFDM signal; and the determining N first subcarriers and P second subcarriers from the M subcarriers based on a preset parameter D comprises:

determining a first frequency band based on the preset parameter D, wherein the first frequency band is a continuous frequency segment on the bandwidth B of the OFDM signal;

determining N subcarriers in the first frequency band as the N first subcarriers; and determining the P second subcarriers based on the first frequency band and the bandwidth B of the OFDM signal.

11. The apparatus according to claim 10, wherein the determining a first frequency band based on the preset parameter D comprises:

determining a bandwidth $\Delta F$ of the first frequency band based on a first preset condition and the preset parameter D; and determining, as the first frequency band, a frequency band with a frequency spacing of $\Delta F$ between a subcarrier with a highest frequency and a subcarrier with a lowest frequency on the bandwidth B.

12. The apparatus according to claim 11, wherein the first preset condition is:

$$\Delta F \le \frac{c}{D},$$

wherein C is a signal propagation speed, D is the preset parameter D, and $\Delta F$ is the bandwidth of the first frequency band.

13. The apparatus according to claim 11, wherein the parameter information further comprises a frequency spacing $\Delta_f$ between adjacent subcarriers of the OFDM signal; and the operations further comprise:

determining the N subcarriers in the first frequency band based on $\Delta F$ and $\Delta_f$, wherein $$N = \frac{\Delta F}{\Delta f} + 1.$$

14. The apparatus according to claim 11, wherein the determining the P second subcarriers based on the first frequency band and the bandwidth B of the OFDM signal comprises:

determining, based on a second preset condition and $\Delta F$, K subcarriers with a highest frequency and K subcarriers with a lowest frequency on the bandwidth B, wherein K is a positive integer less than $$\frac{M}{2},$$

and M is a total quantity of subcarriers comprised in the OFDM signal; and determining, as the P second subcarriers, the K subcarriers with the highest frequency and the K subcarriers with the lowest frequency on the bandwidth B, wherein P=2K.

15. The apparatus according to claim 14, wherein the second preset condition is:

$$1 \le K \le \left\lfloor \frac{B - \Delta F}{2 * \Delta f} \right\rfloor,$$

wherein B is the bandwidth of the OFDM signal, $\Delta_f$ is the frequency spacing between adjacent subcarriers of the OFDM signal, $\Delta F$ is the bandwidth of the first frequency band, and $\lfloor \bullet \rfloor$ is a rounding-down operation.

16. The apparatus according to claim 11, wherein the determining the P second subcarriers based on the first frequency band and the bandwidth B of the OFDM signal comprises:

determining a second frequency band based on the first frequency band, wherein the second frequency band is one or more continuous frequency segments in the bandwidth B, and the second frequency band is a complementary set of the first frequency band for the bandwidth B;

determining, based on a second preset condition and $\Delta F$, K subcarriers with a highest frequency and K subcarriers with a lowest frequency on the second frequency band; and determining, as the P second subcarriers, the K subcarriers with the highest frequency and the K subcarriers with the lowest frequency on the second frequency band, wherein P=2K.

17. A non-transitory computer-readable storage medium coupled to at least one processor and storing programming instructions for execution by the at least one processor to cause an apparatus to perform operations comprising:

obtaining parameter information of an OFDM signal, wherein the parameter information comprises total power W of the OFDM signal and frequencies respectively corresponding to M subcarriers comprised in the OFDM signal;

determining N first subcarriers and P second subcarriers from the M subcarriers based on a preset parameter D, wherein both N and P are positive integers less than M;

allocating W1 in the total power W to frequencies respectively corresponding to the N first subcarriers, and determining a first waveform;

allocating W2 in the total power W to frequencies respectively corresponding to the P second subcarriers, and determining a second waveform, wherein W=W1+W2;

generating, based on the first waveform and the second waveform, the OFDM signal corresponding to the parameter information, wherein the OFDM signal comprises a signal corresponding to the first waveform and a signal corresponding to the second waveform; and using the OFDM signal for ranging measurement and positioning.

18. The non-transitory computer-readable storage medium according to claim 17, wherein the parameter information further comprises a bandwidth B of the OFDM signal; and the determining N first subcarriers and P second subcarriers from the M subcarriers based on a preset parameter D comprises:

determining a first frequency band based on the preset parameter D, wherein the first frequency band is a continuous frequency segment on the bandwidth B of the OFDM signal;

determining N subcarriers in the first frequency band as the N first subcarriers; and determining the P second subcarriers based on the first frequency band and the bandwidth B of the OFDM signal.

19. The non-transitory computer-readable storage medium according to claim 18, wherein the determining a first frequency band based on the preset parameter D comprises:

determining a bandwidth $\Delta F$ of the first frequency band based on a first preset condition and the preset parameter D; and determining, as the first frequency band, a frequency band with a frequency spacing of $\Delta F$ between a subcarrier with a highest frequency and a subcarrier with a lowest frequency on the bandwidth B.

20. The non-transitory computer-readable storage medium according to claim 19, wherein the first preset condition is:

$$\Delta F \le \frac{c}{D},$$

wherein C is a signal propagation speed, D is the preset parameter D, and $\Delta F$ is the bandwidth of the first frequency band.

* * * * *